United States Patent
Zheng et al.

(10) Patent No.: US 8,114,289 B2
(45) Date of Patent: Feb. 14, 2012

(54) METHOD AND APPARATUS FOR MICROFILTRATION TO PERFORM CELL SEPARATION

(75) Inventors: Siyang Zheng, Pasadena, CA (US); Richard Cote, Miami, FL (US); Henry Lin, San Marino, CA (US); Bo Lu, Pasadena, CA (US); Yu-Chong Tai, Pasadena, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 58 days.

(21) Appl. No.: 12/360,067

(22) Filed: Jan. 26, 2009

(65) Prior Publication Data

US 2009/0188864 A1 Jul. 30, 2009

Related U.S. Application Data

(60) Provisional application No. 61/062,814, filed on Jan. 29, 2008.

(51) Int. Cl.
*B01D 63/00* (2006.01)
*B41J 2/175* (2006.01)

(52) U.S. Cl. ............... 210/321.84; 210/189; 347/56; 347/63; 347/61; 347/65; 347/86

(58) Field of Classification Search ............ 210/500.22, 210/321.84, 321.75, 189, 203, 323.1, 433.1; 347/56, 63, 61, 65, 67, 86

See application file for complete search history.

(56) References Cited

U.S. PATENT DOCUMENTS

| 5,985,164 | A | * | 11/1999 | Chu et al. | 216/41 |
| 6,598,750 | B2 | * | 7/2003 | Tai et al. | 210/490 |
| 2002/0113006 | A1 | * | 8/2002 | Sale et al. | 210/490 |
| 2005/0184003 | A1 | * | 8/2005 | Rodgers et al. | 210/321.75 |
| 2006/0252044 | A1 | | 11/2006 | Okumura et al. | |
| 2007/0025883 | A1 | | 2/2007 | Tai et al. | |
| 2007/0190653 | A1 | | 8/2007 | Heinrich | |

FOREIGN PATENT DOCUMENTS

WO 95/21687 8/1995

OTHER PUBLICATIONS

PCT Search Report for PCT/US2009/032054 in the name of California Institute of Technology filed on Jan. 26, 2009.
PCT Written Opinion for PCT/US2009/032054 in the name of California Institute of Technology filed on Jan. 26, 2009.
G. P. Gupta and J. Massague, "Cancer metastasis: Building a framework," *Cell*, vol. 127, pp. 679-695, Nov. 17, 2006.
K. Pantel and R. H. Brakenhoff, "Dissecting the metastatic cascade," *Nature Reviews Cancer*. vol. 4, pp. 448-456, Jun. 2004.

(Continued)

*Primary Examiner* — Krishnan S Menon
*Assistant Examiner* — Allison M Gionta
(74) *Attorney, Agent, or Firm* — Steinfl & Bruno LLP

(57) ABSTRACT

A microfiltration apparatus and method for separating cells, such as circulating tumor cells, from a sample using a microfiltration device having a top porous membrane and a bottom porous membrane. The porous membranes are formed from parylene and assembled using microfabrication techniques. The porous membranes are arranged so that the pores in the top membrane are offset from the pores in the bottom membrane.

20 Claims, 12 Drawing Sheets

OTHER PUBLICATIONS

S. Nagrath, L. V. Sequist, S. Maheswaran, D. W. Bell, D. Irimia, L. Ulkus, M. R. Smith, E. L. Kwak, S. Digumarthy, A. Muzikansky, P. Ryan, U. J. Balis, R. G. Tompkins, D. A. Haber, and M. Toner, "Isolation of rare circulating tumour cells in cancer patients by microchip technology," *Nature*, vol. 450, pp. 1235-UI0, Dec. 2007.

S. Zheng, H. Lin, J.-Q. Liu, M. Balie, R. Datar, R. J. Cote, and Y.-C. Tai, "Membrane microfilter device for selective capture, electrolysis and genomic analysis of human circulating tumor cells," *Journal of Chromatography A*, vol. 1162, pp. 154-161, 2007.

* cited by examiner

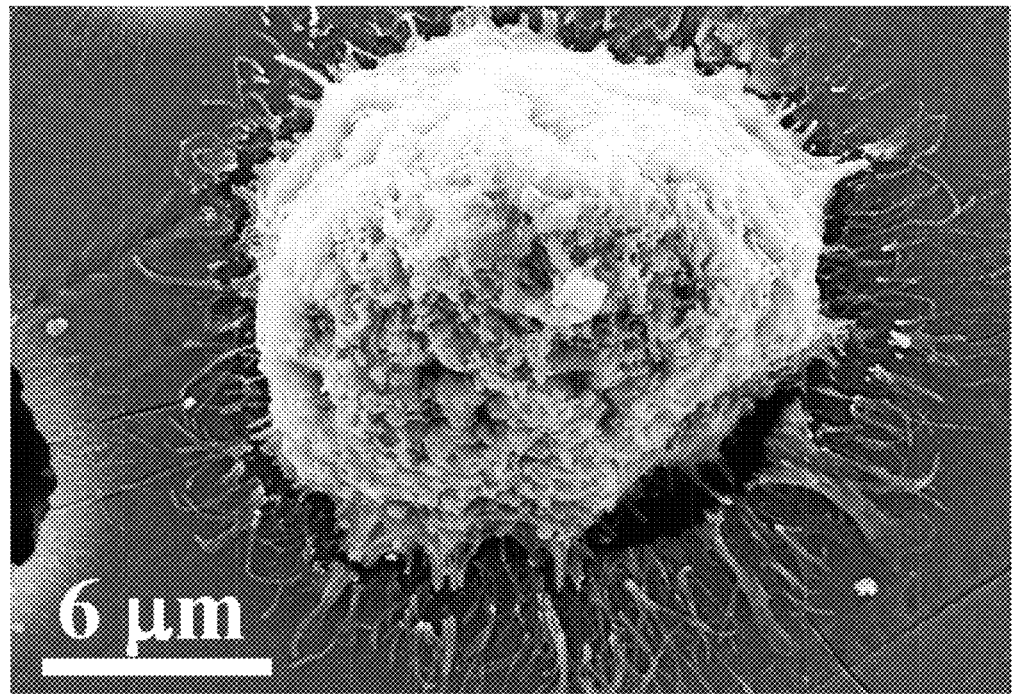
FIG. 10A
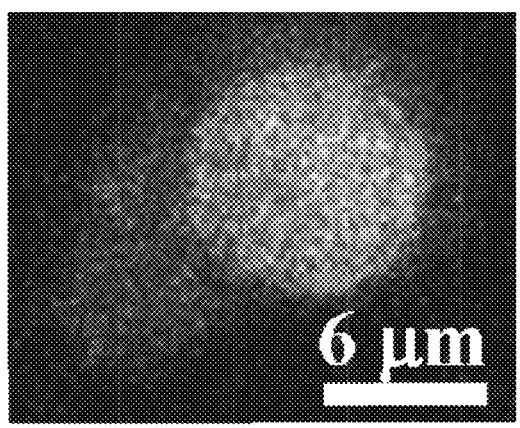 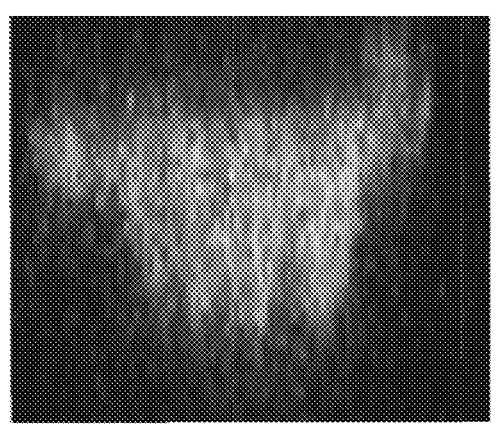
FIG. 10B  FIG. 10C

METHOD AND APPARATUS FOR MICROFILTRATION TO PERFORM CELL SEPARATION

CROSS-REFERENCE TO RELATED APPLICATIONS

This application is related to and claims the benefit of the following copending and commonly assigned U.S. Patent Application No. 61/062,814, titled "3D Micro Membrane Filtration Device for Capture Viable Rare Circulating Tumor Cells from Whole Blood," filed on Jan. 29, 2008; the entire contents of which is incorporated herein by reference.

STATEMENT REGARDING FEDERALLY SPONSORED RESEARCH OR DEVELOPMENT

This invention was made with government support under Grant No. CA123027 awarded by the National Institutes of Health. The U.S. Government has certain rights in this invention.

BACKGROUND

1. Field

This disclosure relates to microfiltration. More particularly, the present disclosure describes devices, methods, apparatus, and systems for microfiltration that can be used for performing cell separation and related investigations, such as for the enrichment of viable circulating tumor cells from blood.

2. Description of Related Art

Cell separation has been a challenge for many years especially when the separation is aimed at performance of several investigations in fields such as biochemistry, molecular biology and biotechnology. Cell separation is considered especially important for those investigations performed on cells that express particularly differentiated functions and are desirably separated from an organic or inorganic sample in a viable state. Examples of such investigations include prognostic and diagnostic assays developed in the medical field, herein exemplified by investigation performed on tumor cells, and in particular on circulating tumor cells in metastatic cancer. Metastasis is the spread of cancer from a primary site to non-adjacent secondary sites through a series of sequential steps, which may include the transport of cancer cells through the circulatory system. When tumor cells are transported in the circulatory system, they are called circulating tumor cells (CTCs) in the bloodstream. CTCs are prognostically critical, associated with clinical stage, disease recurrence, tumor metastasis, treatment response, and patient survival following therapy. CTCs may be used as a surrogate and independent marker for assessing the risk of relapse, guiding course of therapy and treatment monitoring for cancer patients.

The majority of the metastatic tumors are derived from epithelial cells, which have unique properties, in comparison to cells of hematogeneous origin. Therefore, separation of CTC from blood constitutes a particularly challenging example of cell separation, since it is performed from a sample where the cells to be separated are comprised together with other cells that although sharing several features with the CTC, are of no interest for the investigation at issue.

Several approaches have been developed to separate CTCs from blood and enrich CTCs from blood, that are based on distinctive features of different cells types. In particular, exploitation of the intrinsic difference between different cell types forms the foundations to the variety of methods for enriching CTCs of epithelial origin from patient blood.

In a first series of approaches, density gradient centrifugation is traditionally employed to enrich the mononucleocyte (MNCs) fraction, which includes CTCs due to their similar buoyant density. The washed MNC fraction cells are cytospun onto glass slides followed by immunofluorescent staining for epithelial markers (predominantly cytokeratin) to detect CTCs. A trained pathologist typically examines each slide for the presence of CTCs. Moreover, density gradient centrifugation typically has a maximum recovery rate of ~70%.

More recent technologies for CTC enrichment and analysis take advantage of specific surface antigens such as epithelial cell adhesion molecule (EpCAM) for selective capture of epithelial cells. Cellsearch™ is the only FDA approved automated system to capture and assess CTCs to determine the prognosis for metastatic breast, colorectal or prostate cancer. It is based on immunomagnetic separation, in which EpCAM conjugated magnetic beads are used to capture EpCAM positive CTCs from blood under magnetic field. Although clinical studies substantiate its prognostic value, the assay is subject to a large range of recovery rates (9%-90%) due to variable expression of surface markers. An immunoaffinity based "CTC chip" has been developed, where CTCs are captured with antibodies conjugated to surface of micro posts in a microflow chamber. This "CTC chip" has demonstrated CTC capture and detection from patient samples of multiple metastatic cancers. While viable CTCs with high purity can be obtained, the capture efficiency is limited by the variability of surface antigen expression. The throughput and processing time is limited by the stringent conditions of the controlled flow.

Alternatively, techniques for isolation of CTCs based on cell size have been used since the 1960s. Such techniques have been demonstrated to be an efficient, inexpensive and user-friendly way for enrichment of CTCs. Circulating epithelial tumor cells are significantly larger than the surrounding blood cells, where a pore size of ~8 μm in diameter in the isolating medium has been shown to be optimal for CTC retention. Typically, polycarbonate filters are used as the isolating medium for CTC retention. Such filters are typically fabricated using track etching, which results in random placement of pores with relatively low density that often results in fusion of two or more pores, resulting in a lower CTC capture efficiency of 50-60%. In view of the particularly challenging nature of CTC separation from blood, techniques developed for CTC separation can be applied, with proper adjustments, to separate a wide variety of cell types from a wide variety of samples.

SUMMARY

Described herein are devices, apparatus, methods, arrays, and systems according to embodiments of the present invention that allow separation of cells from a sample, and performance of related investigations including functional studies on viable cells.

In particular, embodiments of the present invention provide a microfiltration apparatus and method for capturing viable cells using a microfiltration device preferably having a top porous membrane and a bottom porous membrane and related arrays and systems. The porous membranes are preferably formed and assembled using microfabrication techniques and are arranged so that the pores in the top membrane are offset from the pores in the bottom membrane. The membranes preferably comprise parylene. Filtering may be provided through the capture of cells within the pores of the top membrane or within a gap between the top membrane and the bottom membrane.

More particularly, devices, apparatus, methods, arrays and systems according to embodiments of the present invention allow capture of viable tumor cells, including viable and proliferative CTCs, from samples.

Additionally, devices, apparatus, methods, arrays and systems according to embodiments of the present invention allow capture of cells from samples that do not need to be partially fixed, and/or according to approaches that are compatible for further live cell interrogations.

Furthermore, devices, apparatus, methods, arrays, and systems according to embodiments of the present invention allow capture of cells, including CTCs, according to approaches that may be less time consuming, subjective, expensive and/or labor intensive when compared to approaches known in the art.

BRIEF DESCRIPTION OF THE SEVERAL VIEWS OF THE DRAWINGS

FIG. 10A shows a SEM photograph of a cell with intact membrane captured and sitting in a pore of a porous membrane.

FIG. 10B is an image taken while keeping the focus at the top membrane surface of the cell shown in FIG. 10A FIG. 10C is a reconstructed image based on an image stack of 0.5 μm vertical step size, showing the vertical cross section of the cell trapped in a pore shown in FIG. 10A.

DETAILED DESCRIPTION

Figure 1:
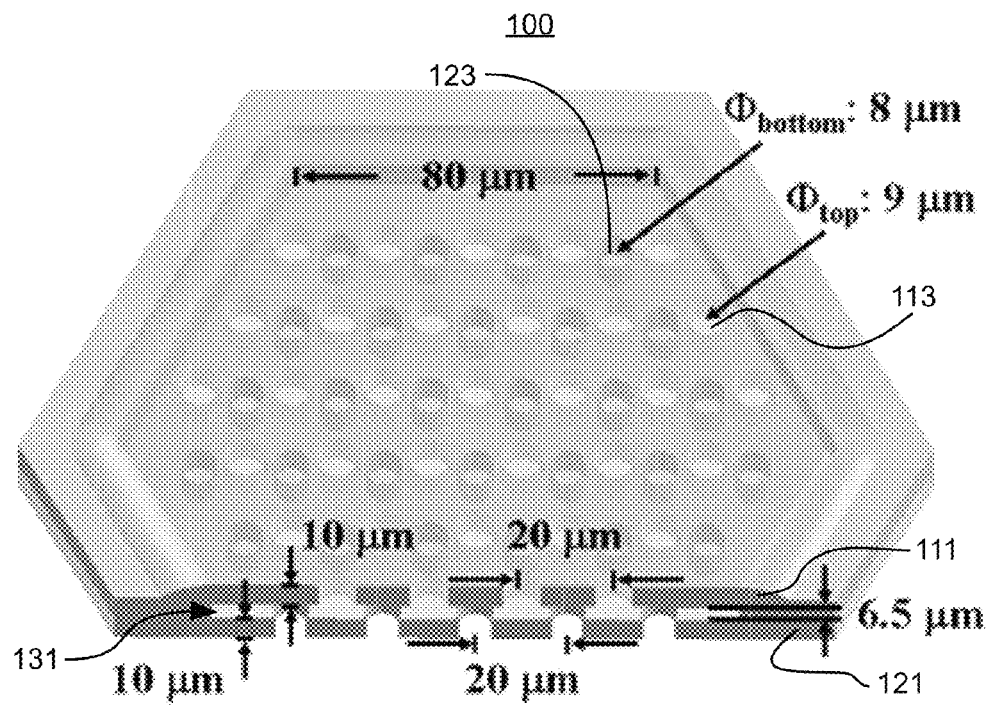
FIG. 1 illustrates a cut-away view of a single filter patch.

The exemplary embodiments according to the present invention described in this disclosure provide devices, apparatus, methods, arrays and systems that may be used for separation and capture of cells, and, in particular, viable cells, from a sample.

The terms "separation", "capture" as used herein with reference to cells indicate the act of setting or keeping apart a predetermined cell from a sample, where the cell is comprised together with additional particles, molecules and/or components including other cells. Examples of separation include, but are not limited to, isolation of a selected cell type from a sample including a cell population, further including additional cell types and grouping of cells based on common structural characteristics, such as size and dimensions that are relevant for filtration purposes.

The term "cell" as used herein indicates a small, usually microscopic, mass of protoplasm bounded externally by a semipermeable membrane, usually including one or more nuclei and various other organelles with their products, capable alone or interacting with other cells of performing all the fundamental functions of life, and forming the smallest structural unit of living matter capable of functioning independently. Cells constitute, in particular, the structural and functional unit of all living organisms, including unicellular organisms (organisms consisting or one cell) and pluricellular organisms (organisms consisting of more than one cell, and having differentiated cells that perform specialized functions in the cell). Exemplary unicellular organisms are microorganisms of microscopic or ultramicroscopic size, such as a prokaryotic or a eukaryotic microbial species where the term "prokaryotic" refers to a microbial species that contains no nucleus or other organelles in the cell, which includes, but is not limited, to Bacteria and Archaea, and the term "eukaryotic" refers to a microbial species that contains a nucleus and other cell organelles in the cell, which includes, but is not limited to, Eukarya such as yeast and filamentous fungi, protozoa, algae, and higher Protista. Exemplary multicellular organisms include all members of the kingdoms Plantae and Animalia and, in particular, animals such as higher animals and, more particularly, vertebrates such as mammals and specifically human beings.

A cell is "viable" when is capable of living and, in particular, to exhibit certain biological processes such as chemical reactions or other events associated with a living state. Exemplary viable cells include cells having attained such form and development as to be capable of surviving outside an environment where the cell is originally located, which includes growing, developing and/or reproducing as an independent unit.

The term "sample" as used herein indicates a limited quantity of something that is indicative of a larger quantity of that something, including but not limited to samples (such as tissues and bodily fluids but also river water and other environmental samples) where the cells of interest are typically comprised with at least one additional type of cells of no interest, and samples where the cells of interest are comprised with additional particles that are not of a cellular nature. Exemplary samples include, but are not limited to, fluids or fluidic preparation from a biological environment, specimens, cultures, tissues preparations or portions thereof. Additionally, exemplary samples include bodily fluids such as sputum, cerebrospinal fluid, sweat, urine, semen, biopsy specimens, pap smear samples or any other sample obtained from an individual including a human or a an animal, that is in a fluidic state or is subjected to appropriate treatments to assume a fluidic state.

A further description of the devices, apparatus, arrays, methods, and systems according to exemplary embodiments of the present invention is provided with reference to applications wherein the sample is blood, and the cells are CTCs. A person skilled in the art will appreciate the applicability of the features described in detail for blood samples and CTC for other biologic, organic and inorganic samples and for other cell type. The exemplary embodiments described herein, although designed to separate CTC from blood, could be used to obtain cell from any medium containing micron sized particles (including other cells).

In some embodiments, the devices, apparatus, methods, arrays and systems herein disclosed allow separation of viable cells, minimizing application of mechanical trauma to the cells and minimizing membrane damages. Mechanical trauma (e.g., as induced by passage through filter pores) has been associated with membrane damage. Micropipette experiments on artificial phospholipids showed membrane rupture when their tensions were increased above a critical level, i.e. membrane area increment exceeding 3%. The tension at which cell lysis occurs may be as low as 3 mN/m in these membrane models. The maximum tensions at the surfaces of seven different types of cancer cells, measured from micropipette-deformability study, have a median value of 3.7 mN/m and range from 0.8 to 5.0 mN/m. When tumor cells are directed towards a filter having pores with diameters approximately equal to the size of the cells, the damage can result from either of the two stages of the filtration process. The first stage starts from when the cell begins to have interaction with the pore edge until this is fully trapped. This is a dynamic process which typically happens in millisecond range in experimental conditions. The second stage is from this full entrapment to the end of the overall filtration process. During this stage, the cell will experience the static back pressure. Under 0.5 psi back pressure, a two dimensional microfilter of 8 µm diameter pore size is calculated to have 13.8 mN/m cytoplasm membrane tension at the contact circumference to the device under the static back pressure condition. Compared with the critical tension for cell rupture, even this tension under static pressure can cause cell damage, not to mention the cell membrane tension during the first stage dynamic process of the filtration.

In some embodiments, a microfiltration patch is provided that comprises a top porous membrane having top membrane pores and a bottom porous membrane having bottom membrane pores. In the patch, the top membrane pores and the bottom membrane pores can be arranged so that several bottom membranes pores are distributed in the bottom porous membrane to be horizontally offset from several top membrane pores distributed in the top porous membrane. Additionally, the patch can include a gap separating the top porous membrane and the bottom porous membrane, wherein a gap distance between the top porous membrane and the bottom porous membrane provided by the gap is sized to selectively capture cells of interest.

In particular, embodiments of the present invention use a microfilter device with at least two layers of porous membranes, preferably parylene membranes. Within the present disclosure, microfilter devices may be referred to as 3D microfilters, 3D microfiltration units, devices or systems, since filtration is provided by pores distributed in both the X and Y direction and in the Z direction (i.e., filtration is provided by at least two planes of pores). A preferred embodiment has a top porous membrane and a bottom porous membrane. Both the top and bottom membranes have pores that may be defined by microfabrication. A gap between the two membranes may be defined precisely by photolithography. Preferably, the pore positions of the bottom membrane are shifted from the pore positions of the top membrane. With this configuration of top and bottom pore positions, when tumor cells are trapped in the pores of the top membrane, the bottom membrane can provide direct force in the opposite direction of the back pressure and effectively reduce the tension on cell plasma membrane. The tension reduction applies to both the dynamic process during which the cell is plugged into a pore, and later when the cell is under static pressure. Hence, embodiments of the present invention may reduce the cell membrane tension that often results in cell membrane damage.

FIG. 1 illustrates a cut-away view of a single filter patch 100 according to an embodiment of the present invention. In FIG. 1, the filter patch 100 comprises a top membrane 111 with several top membrane pores 113 and a bottom membrane 121 with several bottom membrane pores 123. The top membrane 111 and bottom membrane 121 are spaced apart in the vicinity of the top pores 113 and bottom pores 123 by a gap 131. Note that FIG. 1 shows a filter patch having a hexagonal shape, but other embodiments may have filter patches having different shapes. Further, the dimensions and the number of top pores 113 and bottom pores 123 shown in FIG. 1 are for exemplary purposes only. Other embodiments of the present invention may have filter patches with different dimensions and/or different numbers of pores.

Figure 2:
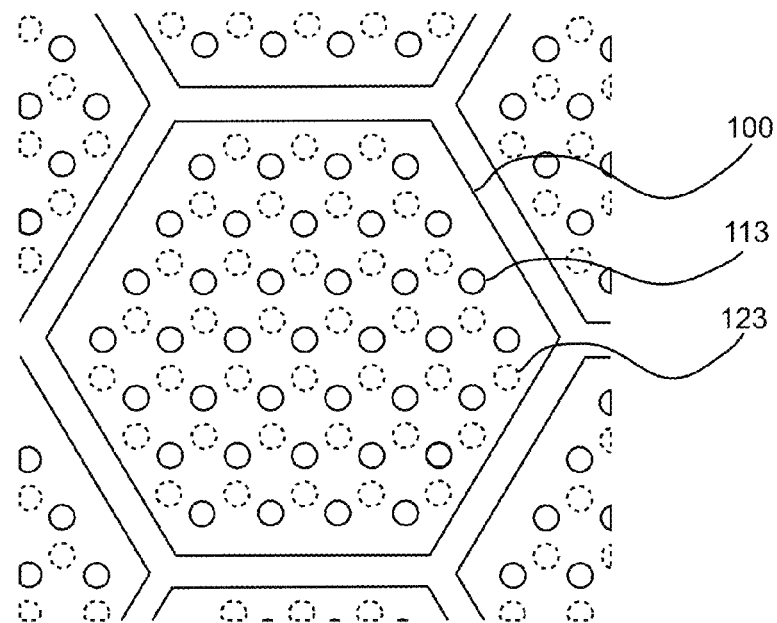
FIG. 2 illustrates a top down view of the single filter patch 100 depicted in FIG. 1

FIG. 2 illustrates a top down view of the single filter patch 100 depicted in FIG. 1. As shown in FIG. 2, the bottom pores 123 are preferably offset from the top pores 113 so that the portion of the bottom membrane 121 located directly beneath each top pore 113 is substantially or entirely solid. Returning to FIG. 1, the top pores 113 are shown as having diameters of 9 µm and the bottom pores 123 as having diameters of 8 µm. Both the top pores 113 and bottom pores 123 are shown as having centers located 20 µm apart. As shown in FIG. 1, the top pores 113 and bottom pores 123 are offset such that the membrane 111, 121 above or below each pore is solid. FIG. 1 further illustrates that the membranes 111, 121 are 10 µm thick, but alternative embodiments of the present invention may use different thicknesses. The gap 131 is illustrated as having a thickness of 6.5 µm, but alternative embodiments may use a different thickness. The gap thickness is preferably chosen to allow non-cancer cells to flow through the filter patch 100, but to reduce tension on cell plasma membrane as indicated above and described in additional detail below.

To allow for sufficient capture of, cells and, in particular, tumor cells through filtration, multiple filter patches are preferably fabricated (see discussion below for description of a fabrication process according to an embodiment of the present invention).

In particular, in some embodiments, multiple filter patches are arranged in microfiltration arrays. In several of those arrays, each microfiltration patch comprises top membrane pores arranged in a first geometrical array and bottom membrane pores arranged in a second matching geometrical array. In the array, the several microfiltration patches can be separated from each other by areas in which the top membrane contacts the bottom membrane.

Figure 3:
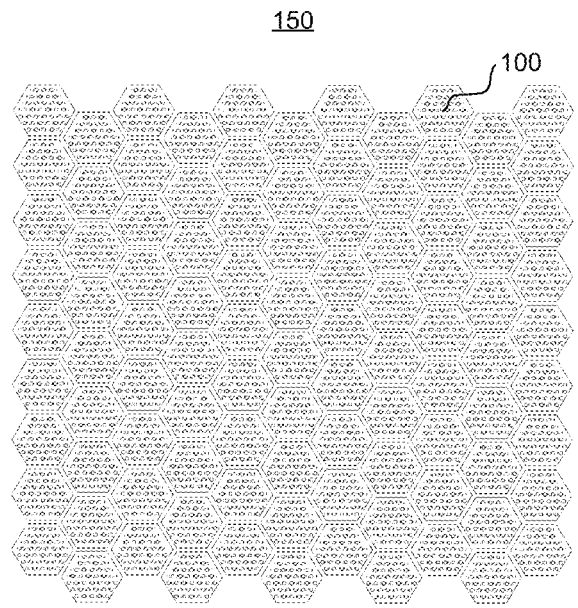
FIG. 3 depicts multiple filter patches of the type shown in FIG. 1 arranged into a filter array.
Figures 4A, 4B, 4C:
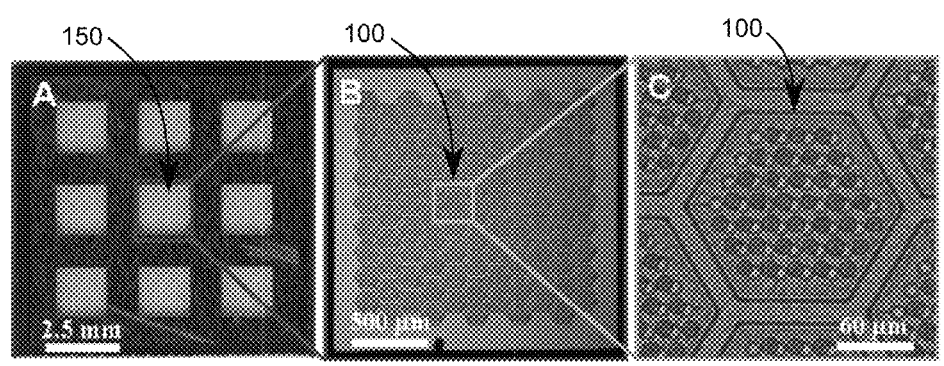
FIG. 4A shows a photograph of nine filter arrays formed on a 1 cm silicon die.
FIG. 4B shows a close-up photograph of one of the filter arrays shown in FIG. 4A, where the filter array has ninety-nine filter patches.
FIG. 4C shows a close-up photograph of one of the filter patches shown in FIG. 4B.

FIG. 3 depicts multiple filter patches 100 of the type shown in FIG. 1 arranged into a filter array 150. Microfabrication techniques may be used to form the filter patches 100 and filter arrays 150 on a silicon wafer. FIGS. 4A, 4B and 4C show photographs of filter patches 100 and filter arrays 150 formed on a 1 cm silicon die. FIG. 4A shows nine filter arrays 150 formed on a 1 cm silicon die. FIG. 4B shows an enlargement of one of the filter arrays, where the array consists of 99 hexagonal filter patches. FIG. 4C shows an enlargement of one of the filter patches 100 within the filter array 150 surrounded by other filter patches 100.

The filter patches can be fabricated according to several embodiments of a method for fabricating a microfiltration device herein disclosed, for the capture of chosen cell types from a fluid sample. In some embodiments, the method comprises: depositing a first layer of a membrane material on a front side of a support layer, creating top layer or bottom layer pores on the first layer of membrane material and depositing a photoresist layer above the top layer or bottom layer pores. In those embodiments, the method further comprises, depositing a second layer of membrane material on the photoresist layer, creating in the second layer of membrane material layer pores that are complementary to the layer pores of the first layer and removing the photoresist layer. Layer pores complementary to the first layer consist, in particular, of bottom layer pores, in embodiments wherein top layer pores are created in the first layer, and/or top layer pores in embodiments wherein bottom layer pores are created in the first layer. In some embodiments, including embodiments where the method is used for fabricating patches arranged in arrays, the method can include depositing multiple first layers of membrane material and multiple second layers of membrane material and/or the photoresist layer can be etched to create membrane layers contact areas.

Figure 5A:
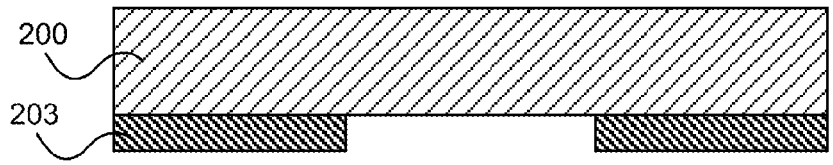
FIGS. 5A-5E illustrate a process for fabricating a 3D filtration unit.

FIGS. 5A-5E illustrate an exemplary embodiment of a process for fabricating a 3D microfiltration unit according to the present invention as depicted in FIGS. 4A-4C. FIG. 5A shows the preparation of a Si wafer for the formation of the microfiltration units. Alignment marks (not shown) are first generated on both sides of a prime Si wafer 200. A silicon dioxide layer 203 is formed on the backside of the Si wafer 200 by 1 μm thermal oxidation backside oxide patterning and oxide stripping is performed on the front-side of the wafer 200. To form the nine filter arrays on a 1 cm by 1 cm die as depicted in FIG. 4A, the silicon dioxide layer 203 is patterned to provide nine cavities.

Figure 5B:
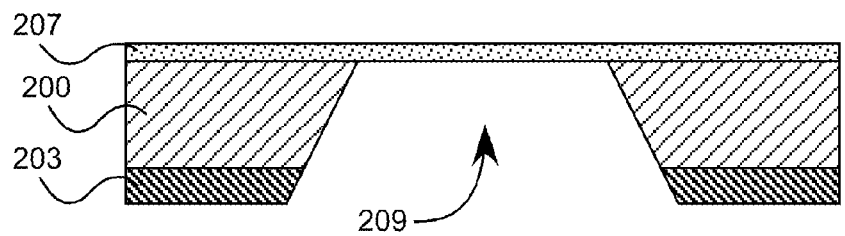

After the preparation of the Si wafer 200, a 5 μm thick parylene-C thin film is deposited on the front-side of the wafer 200 and melted at 350° C., forming a molten parylene layer 207 as shown in FIG. 5B. This layer eventually integrates as part of the bottom filter membrane through annealing and also provides front side protection during wet etching in the next step of the process. FIG. 5B also shows the creation of the through-wafer cavity 209. This cavity is created by etching with tetramethylammonium hydroxide (TMAH) from the backside, with the silicon dioxide layer 203 as etching mask.

Figure 5C:
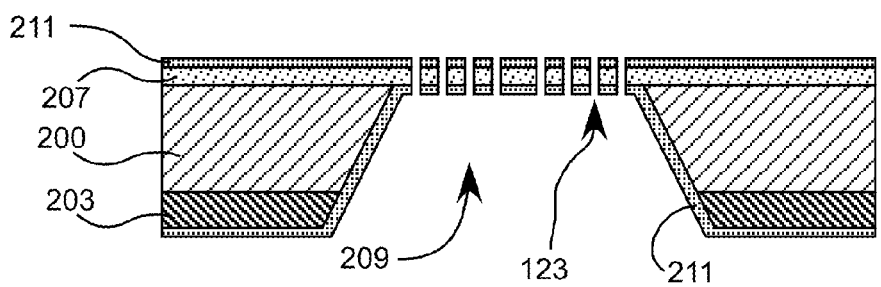

FIG. 5C depicts the deposition of a second 2.5 μm-thick parylene-C layer 211 on both sides of the Si wafer 200 and patterned with oxygen plasma. In the cavity regions 209, this second parylene layer 211 sandwiches the molten parylene layer 207 to form the bottom filter layer of the filtration unit. The oxygen plasma patterning of the parylene layers 207, 211 forms the bottom pores 123 of the filtration unit.

Figure 5D:
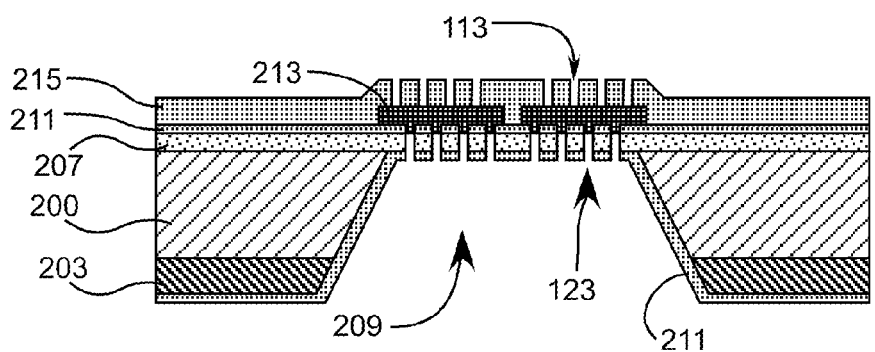

FIG. 5D depicts the deposition and patterning of the top parylene layer 215. A 6.5 μm-thick sacrificial photoresist layer 213 is spin-coated and patterned to form the gap 131 depicted in FIG. 1. The photoresist may comprise AZ4620, or any other photoresist compatible with the materials used to form the device. A 10 μm-thick parylene layer 215 is deposited and patterned from the front-side to form the top pores 113.

Figure 5E:
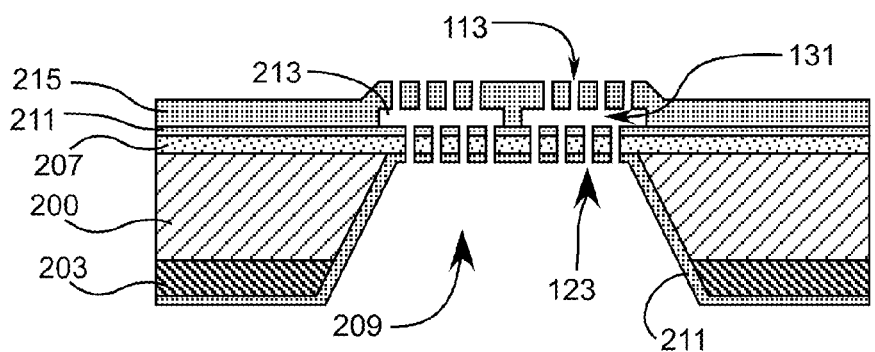

FIG. 5E depicts the completed structure. The layer 213 is dissolved in acetone, leaving the gap 131. Preferably, after the removal of the photoresist layer 213, 190° C. parylene annealing is performed on the structure for forty-eight hours to strengthen the overall structure. Note that in the process depicted in FIGS. 5A-5E, the pore size, shape and density in the filtration device are defined by photolithography, while the gap between the top and bottom layers is defined by the thickness of the sacrificial photoresist, making this fabrication process versatile to changes in key parameters during the optimization process.

In order to maintain the gap distance during filtration, each cavity 209 may consist of 99 hexagonal patches, where the top and bottom parylene layers 111, 121 are in contact and annealed along the edges to provide structural support. Each patch may have thirty-six 9 μm diameter pores 113 on the top parylene layer 111 and thirty-seven 8 μm diameter pores 123 on the bottom parylene layer 121. As discussed above, the pore positions on the top and bottom layers 111, 121 are shifted so that a flow-through particle has to traverse through the gap in between the layers 111, 121, which effectively acts as a third dimension during filtration.

In some embodiments, the microfiltration arrays can further be arranged in microfiltration systems in which one or more microfiltration patches comprise at least two membrane layers and/or are formed within at least a portion of a silicon wafer. In those embodiments, the microfiltration system further comprises an upper area located above the top porous membranes of the microfiltration patches, wherein the upper area is pressurizable, and a lower area located beneath the bottom porous membranes of the microfiltration patches, wherein the lower area is configured to allow reception of fluids.

Embodiments of microfiltration devices, arrays and systems herein described can be used to separate cells from a sample according to a method herein disclosed wherein the cells of interest are captured by membranes arranged so to provide a direct force in the opposite direction of the back pressure and effectively reduce the tension on the plasma membrane of the cell.

In some embodiments, the method comprises: applying the fluid sample to a first membrane having several first membrane pores; flowing the fluid sample through the several first membrane pores into a gap defined by a distance between the first membrane and a second membrane, wherein the distance between the first membrane and the second membrane is smaller than the diameters of the cells to be captured; and flowing the fluid sample through several second membrane pores in the second membrane. In particular, in the method, the second membrane pores can be located in the second membrane so as not to be directly beneath the first membrane pores located in the first membrane.

Figure 6A:
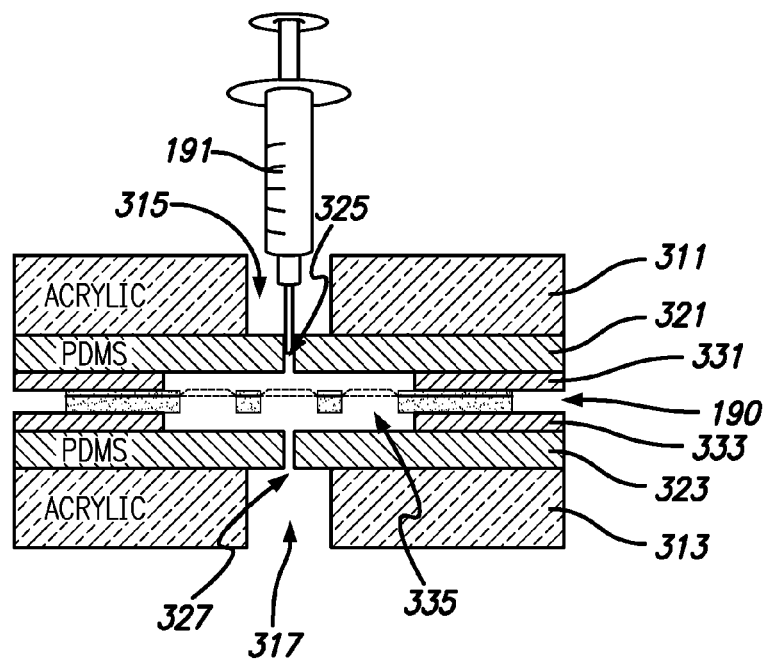
FIG. 6A illustrates a test setup using a 3D filtration apparatus.
Figure 6B:
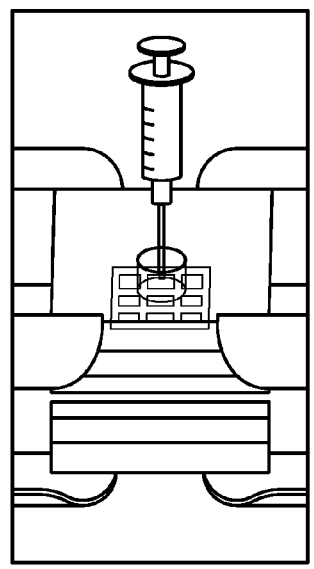
FIG. 6B shows a depiction of the experimental assembly illustrated in FIG. 6A.

Preferably, in several embodiments, samples carrying possible circulating tumor cells will be applied to filtration apparatus according embodiments of the present invention under some pressure, facilitating the flow of smaller size cells through the filtration apparatus while allowing for the capture of larger size tumor cells. For example, see FIG. 6A which shows a 3d microfiltration apparatus 190 according to an embodiment of the present invention clamped between four pieces of Polydimethylsiloxane (PDMS) 321, 323, 331, 333 and two machined acrylic parts 311, 313. The two thin PDMS pieces (~1 mm thick) 331, 333 have an 8 mm by 8 mm central square hole 335, which forms a chamber for sample to flow through the filtration apparatus 190. The two thick PDMS pieces (~4 mm) 321, 323 each have a small circular central hole 325, 327 for inlet or outlet. One hole 325 serves as a receiving port for sample 191 injection, which forms good sealing with a needle and can withstand the pressure during operation (up to several psi). The other hole 327 is open to atmosphere pressure for collection of the filtrate. The two acrylic pieces 311, 313 each have a central hole 315, 317 of 3 mm diameter to allow access to the inlet and outlet while providing structural rigidity for the final assembly with clamps. Depending on the final sample volume, syringes of different volume may be connected to Luer adapters and used for sample 191 introduction. In an experimental assembly, samples were manually pushed through an assembly such as that shown in FIG. 6A at a flow rate less than 10 mL/min. FIG. 6B shows a depiction of the experimental assembly.

Figure 7A:
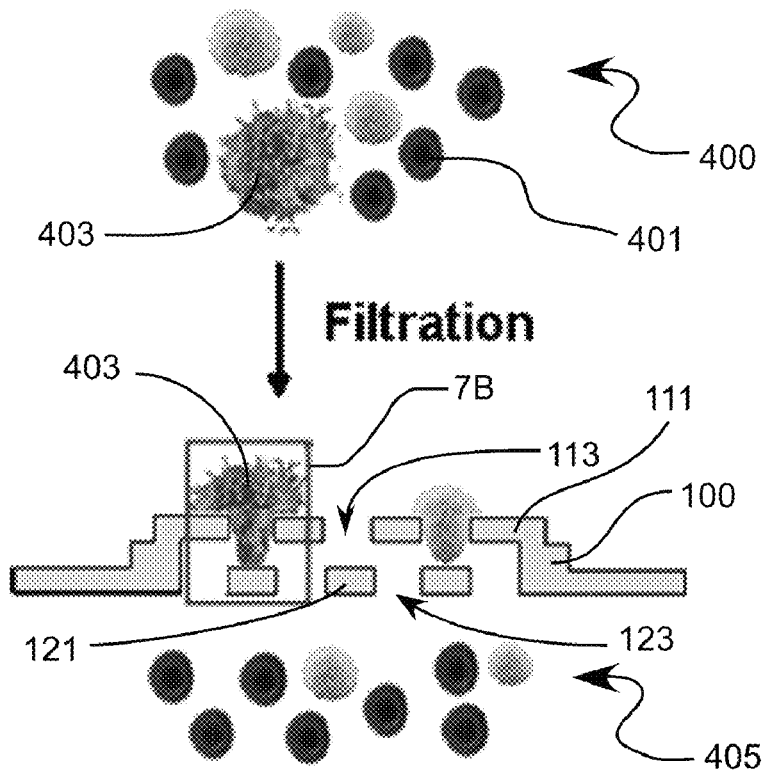
FIG. 7A illustrates application of a sample fluid containing a tumor cell to a filter patch.
Figure 7B:
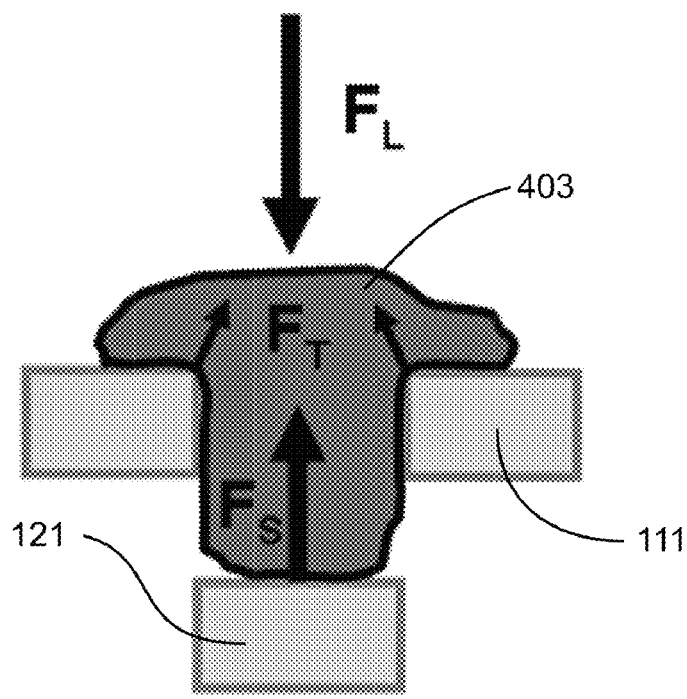
FIG. 7B shows a tumor cell wedged within a filter patch.

As discussed above, embodiments of the present invention may provide for a reduction in the tension on cell plasma membrane of a captured cell, thus allowing the cell to be more easily identified. FIG. 7A shows the application of a sample fluid 400 containing tumor cells 403 and other smaller sized cells 401 to a filter patch 100. As shown in FIG. 7A, a tumor cell 403 is wedged in a top pore 113 of the top membrane 111 of the filter patch 100. The smaller sized cells 401 flow through the patch 100 to form the filtrate 405 passed by the patch 100. FIG. 7B shows a close up of the wedged tumor cell 403, where the tumor cell 403 is supported by the bottom membrane 121. Most particularly, the forces present with respect to the tumor cell 403 are shown, where $F_L$ is the force caused by fluidic pressure from top, $F_S$ is the supporting force from the bottom membrane 121, and FT is the tension force on plasma membrane caused by the top membrane 111. Note that in embodiments of the present invention, the top and bottom pore sizes, the pore density, and the gap can all be varied. For CTC enrichment from blood, any pore to directly capture CTC will need to between roughly 3 um to 15 um. Towards the smaller size (3 um), more and more blood cells will be captured so enrichment becomes worse. Towards the larger size (15 um), more and more CTC can escape from the device, so the capture efficiency becomes worse.

The effects of the static back pressure induced cell membrane tension during the filtration process were studied. The performance of single membrane filters was compared to filters having the two membrane structure according to exemplary embodiments of the present invention.

In particular, the single membrane filters considered are the microfabricated single layer parylene microfilter devices developed by Applicants. and described in U.S. patent application Ser. No. 11/408,501, "Membrane Filter for Capturing Circulating Tumor Cells," filed on Apr. 20, 2006 and U.S. patent application Ser. No. 11/408,499, "Uses of Parylene Membrane Filters," filed on Apr. 20, 2006, each of which is incorporated herein by reference in its entirety. These applications describe single layer microfilters with high density uniform pores and precisely defined geometry made using standard microfabrication processes in a cost-effective way. Within the present disclosure, such single layer microfilters may be referred to as 2D microfilters or 2D filtration systems, since filtration is provided by an array of pores distributed in an X and Y direction (i.e., within a single plane). Such microfilter devices may be suitable for enumeration of CTCs in blood from metastatic cancer patients providing high recovery and enrichment rates along with fast processing time.

In particular, for the single membrane filters, a membrane piece of 25 pores in a five by five array with 30 µm distance among the pores was simulated. For the two membrane structure, a single patch such as that shown in FIG. 1 was simulated. The modeling and simulations of the fluidic field were performed by using incompressible Navier-Stokes steady-state analysis. According to the properties of human blood, a fluid density was chosen as 1025 kg/m$^3$, and the dynamic viscosity was 3×10$^{-3}$ Pa·s. "Slip/symmetry" boundary conditions were used on the side walls to represent the repeated structure. No-slip boundary conditions were used for elsewhere except for inflow and outflow surface. Assuming the same effective total area on a 1 cm by 1 cm device and the same processing time of the single membrane device and two membrane device (7.5 mL of blood filtered in 2 minutes), the model assumed an inflow rate of 0.002 m/s applied on the top surface for both cases. A zero pressure condition was applied to outflow surface.

The simulation showed that the fluid field is almost uniformly distributed on the two membrane structure device, although the positions of the pores are shifted and the top pores themselves are not symmetrically located. Therefore, the simulation results verify that all the pores may be efficiently used during a cell filtration test.

Figure 8:
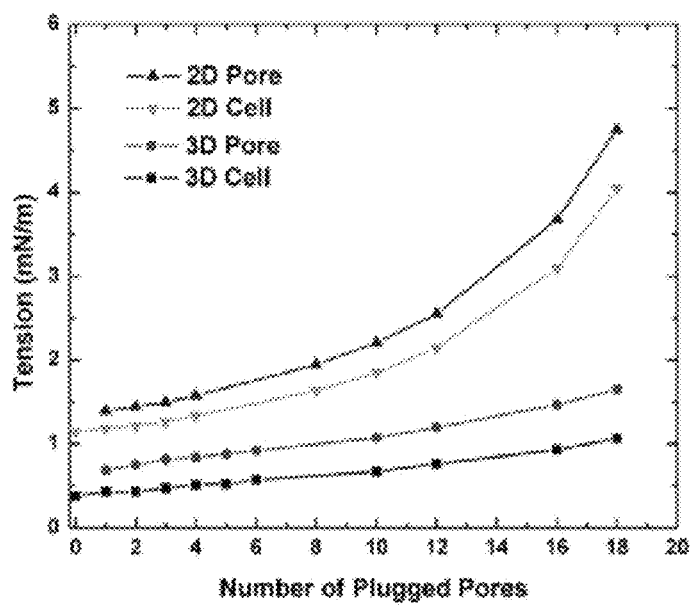
FIG. 8 shows calculated tensions on the rim of an empty pore and a plugged cell for 2D and 3D microfilter devices.

FIG. 8 shows results where increasing numbers of cells are plugged in the pores around a central open pore. FIG. 8 shows calculated tensions on the rim of an empty pore and a plugged cell for 2D and 3D microfilter devices. For simplicity, the simulation makes the membrane continuous at that spot if a cell is plugged there. Back pressure was measured locally at both the surrounding plugged pores and the central open pore. For comparison with the critical membrane tension, the pressure differences are converted to tension according to ΔP r/2, where r is the radius of the pore. The tension on cell is an estimation of the tension of cell membrane at the pore edge after it plugs and static back pressure is still applied. In FIG. 8, 2D refers to the single membrane filtration device (since filtration is only provided in a single plane), while 3D refers to a two membrane filtration device according to an embodiment of the present invention.

For the 3D case, the support to a trapped cell from the bottom membrane was not considered and instead just the local pressure on the surface of the bottom membrane was used. It is believed that the real membrane tension for an actual two membrane device should be even smaller. As shown in FIG. 8, this overestimated tension on cell for the 3D device (two membrane) is only about 50% or smaller compared with that of the 2D device (single membrane). The tension on a cell for 2D devices is in the range of the critical membrane tension of tumor cells mentioned earlier, which suggests even the static pressure can damage the cells due to plasma membrane rupture. Tension on the pore is calculated from the back pressure for an open pore with some of its neighboring pores being plugged. Larger back pressure is likely to cause larger cell membrane tension during the dynamic process of cell plugging into the pore, thus causing cell damage. The back pressure of 2D devices is about 3 times larger than that of the 3D devices, which suggests cells are more likely to be damaged during the dynamic plugging process in 2D devices compared with the 3D devices.

Embodiments of microfiltration devices arrays and systems herein described can be used to perform several assays, including but not limited to assays for the detection and/or separation of targets, including cells and biomarkers related thereto.

The term "detect" or "detection" as used herein indicates the determination of the existence, presence or fact of a target or a related signal in a limited portion of space, including but not limited to a sample, a reaction mixture, a molecular complex and a substrate. A detection is "quantitative" when it refers, relates to, or involves the measurement of quantity or amount of the target or signal (also referred as quantitation), which includes, but is not limited to, any analysis designed to determine the amounts or proportions of the target or signal.

A detection is "qualitative" when it refers, relates to, or involves identification of a quality or kind of the target or related signal in terms of relative abundance to another target or related signal, which is not quantified.

The term "target" or "target molecule" as used herein indicates an analyte of interest. The term "analyte" refers to a substance, compound or assembly of interest, including cells, whose presence or absence in a sample has to be detected. Analytes include, but are not limited to, biomolecules and in particular biomarkers. The term "biomolecule" as used herein indicates a substance compound or component associated to a biological environment including, but not limited to, sugars, amino acids, peptides proteins, oligonucleotides, polynucleotides, polypeptides, organic molecules, haptens, epitopes, biological cells, parts of biological cells, vitamins, hormones and the like. The term "biomarker" indicates a biomolecule that is associated with a specific state of a biological environment including, but not limited to, a phase of cellular cycle, health and disease state. The presence, absence, reduction, upregulation of the biomarker is associated with and is indicative of a particular state. Exemplary biomarkers include breast cancer marker HER2, ovarian cancer marker CA125, and heart disease marker thrombin.

In some embodiments, target detection can be performed by using a label or labeled molecule that bind directly or indirectly to the target, wherein binding of the target to the labeled molecule is associated with the emission of a labeling signal.

The terms "label" and "labeled molecule" as used herein refer to a molecule capable of detection, including, but not limited to, radioactive isotopes, fluorophores, chemiluminescent dyes, chromophores, enzymes, enzymes substrates, enzyme cofactors, enzyme inhibitors, dyes, metal ions, nanoparticles, metal sols, ligands (such as biotin, avidin, streptavidin or haptens) and the like. The term "fluorophore" refers to a substance or a portion thereof which is capable of exhibiting fluorescence in a detectable image. As a consequence, the wording and "labeling signal" as used herein indicates the signal emitted from the label that allows detection of the label, including, but not limited to, radioactivity, fluorescence, chemoluminescence, production of a compound in outcome of an enzymatic reaction and the like.

The term "signal" or "labeling signal" as used herein indicates a detectable physical quantity or impulse by which messages or information can be transmitted, which include, but is not limited to, radioactivity, fluorescence, and, in particular, immunofluoresnce, chemoluminescence, production of a compound in outcome of an enzymatic reaction and the likes.

Several assays can be performed using embodiments of the present invention, including, but not limited to, assays for the detection of specific protein expression of captured cell using immunofluorescence as an integral part of the CTC separation process and detection of viability of captured tumor cells and additional assays identifiable by the skilled person upon reading of the present disclosure.

In particular, as discussed in additional detail below, tests were performed with embodiments of the present invention using various samples. For example, SEM photographs were produced. After a microfiltration device was used to filter a sample, the device was first rinsed in Dulbecco's phosphate buffered saline (PBS) for two minutes and replaced with primary glutaraldehyde fixative (0.1 M sodium cacodylate, 5% glutaraldehyde, 0.1 M sucrose, pH 7.4 in PBS) in fume hood for 45 minutes with occasionally gentle mixing. The glutaraldehyde fixative was later removed and replaced with buffered sucrose vehicle (0.1 M sodium cacodylate, 0.1 M sucrose, pH 7.4) for 30 minutes followed by incubation with secondary osmium fixative (0.1 M sodium cacodylate, 0.1 M sucrose, 1% osmium tetroxide, pH 7.4) for 60 minutes. Dehydration and drying procedure started with five minutes distilled water wash twice, followed by sequentially immersing the device in 35%, 70%, 85%, and 95% ethanol for 10 minutes each, and 100% ethanol for 20 minutes. Finally the device was inserted in 100% hexamethyldisilazane (HMDS) for five minutes and kept in a desiccator before observation with an Oxford LEO 1550VP field emission scanning electron microscope (SEM).

Samples were used that contained carcinoma cells. Human prostate adenocarcinoma cell line (LNCaP) and human breast adenocarcinoma cell line (MCF-7) were purchased from American Type Culture Collection (Manassas, Va., USA) and cultured using recommended media and conditions in a humidified incubator at 5% CO2 and 37° C. Adherent cells were harvested using GIBCO® Trypsin-EDTA (Invitrogen, Carlsbad, Calif., USA) and cell counts were assessed using hemocytometer. Harvested cells were washed twice in PBS and resuspended to a concentration of ~106 cells/mL. Cells were labeled with Carboxyfluorescein diacetate, succinimidyl ester (CFSE) (Invitrogen, Carlsbad, Calif., USA) by incubation with final concentration of 20 µM CFSE at 37° C. for 15 minutes followed by 30 minutes incubation in complete medium at 37° C. Labeled cells were washed twice in PBS before each experiment.

To better define the boundary of the cells trapped on a device, CFSE labeled cells were further labeled with Lissamine™ Rhodamine B 1,2-dihexadecanoyl-sn-glycero-3-phosphoethanolamine, triethylammonium (rhodamine DHPE, Invitrogen, Carlsbad, Calif., USA). The labeling procedure started with making a 1 mM stock solution of Rhodamine DHPE in ethanol. CFSE labeled cells were suspended in PBS at a concentration of 106 cells/mL. Rhodamine DHPE was added to the cell suspension with the final concentration of 1 µM. The mixture was then incubated for 5 min at 37° C. Finally it was centrifuged and rinsed once with PBS. The confocal microscopy images were taken with a Zeiss LSM Pascal inverted laser scanning microscope. Images were processed with Zeiss LSM software.

Samples were prepared by passing known quantities of cultured tumor cells (MCF-7 and LNCaP) in PBS or blood from healthy donors through a microfiltration device as discussed in additional detail below. Devices with captured cells were first rinsed with PBS twice followed by fixation with 10% neutral buffered formalin for 20 minutes. Fixed samples were washed with PBS and ready for Immunofluorescent (IF) Analysis mostly using antibodies obtained from Invitrogen, Carlsbad, Calif. unless noted otherwise. A cocktail of two different mouse monoclonal antibodies against cytokeratins (CKs) was used for the detection of epithelial tumor cells: AE-1 (1:600 dilution, Signet, Dedham, Mass., USA) against low and intermediate Type I acidic keratins and CAM 5.2 (1:100 dilution, Beckton-Dickinson, San Jose, Calif., USA) against CK 8 and 18. The devices were incubated for 1 hour in the cocktail of primary antibodies diluted in CheMate antibody diluent (DakoCyotmation, Carpinteria, Calif., USA). Subsequently, the slides were washed and incubated for 1 hour with Alexa Fluor 488 conjugated goat anti-mouse secondary antibody. For double staining with LNCaP prostate cancer cell line, similar procedure was repeated twice in sequence using rabbit anti-CK as 1st primary antibody and Alexa Fluor 568 conjugated goat anti-rabbit IgG as 1st secondary antibody for detection of CK followed by mouse anti-PSA as 2nd primary antibody and Alexa Fluor 488 conjugated goat anti-mouse IgG as 2nd secondary antibody for confirming captured CK positive cells were of prostate origin. The IF images were obtained using a Nikon Eclipse 80i microscope (Nikon, Japan) with B-2E/C filter cube for green fluorescent channel and G-2E/C for red fluorescent channel, while using a cooled CCD camera (RT-KE color 3-shot, Diagnostic Instruments, Sterling Heights, Mich., USA) for image capture.

Figure 9A:
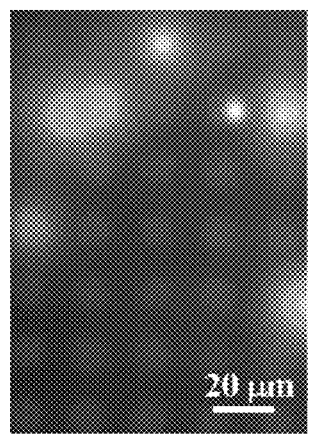
FIGS. 9A-9C show a comparison between 2D and 3D microfilter devices by filtering unfixed CFSE labeled MCF-7 cells under the same flow rates to demonstrate the functionality of capturing intact viable cells.
Figure 9B:
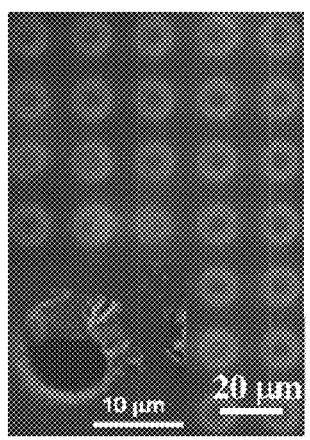
Figure 9C:
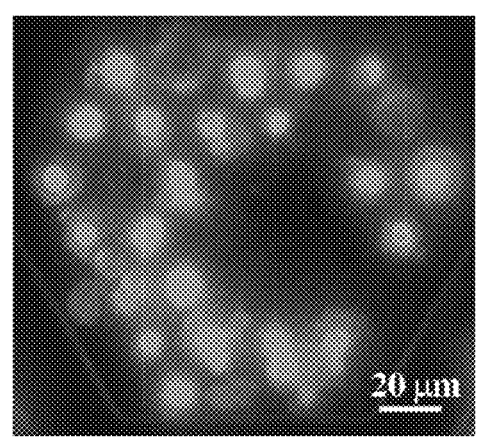

FIGS. 9A-9C show a comparison between 2D and 3D microfilter devices by filtering unfixed CFSE labeled MCF-7 cells under the same flow rates to demonstrate the functionality of capturing intact viable cells. FIG. 9A shows the results of simply pipetting a droplet of buffer containing labeled cells on a 2D microfilter device without filtration. The intact cells are shown as the bright spots in FIG. 9A. FIG. 9B shows that the 2D microfilter device failed to retain intact cells. Moreover, intact cells were not observed in the filtrate of the sample, which rules out the possibility of intact cells squeezing through the pores and suggests cell lysis during filtration. Under careful examination using a fluorescence microscope, faint green fluorescence was observed on the 2D devices coming from the edges of pores, which were thought to be cell membrane remnants. The scanning electron microscope photograph shown in the inset of FIG. 9B shows the cell membrane remnant. FIG. 9C shows that the 3D device can capture MCF-7 cells while preserving cell membrane integrity as demonstrated by the bright fluorescence areas indicating intact cytoplasm. This direct comparison between the 2D and 3D microfilter devices demonstrates the capability of 3D device for capturing viable unfixed tumor cells.

The pore density of the examined 2D devices was about $1.12 \times 10^5 / cm^2$, which corresponds to a fill factor (open pore area to overall area) of 5.6%. While higher density 2D filters of $2.5 \times 10^5 / cm^2$ (fill factor 12.6%) may be fabricated, the high pore density typically disrupts the image quality. With a 3D microfilter device according to an embodiment of the present invention, each patch has a pore density of about $2.89 \times 10^5 / cm^2$, corresponding to a fill factor of 14.5%; however, considering the border effect of each patch, the pore density and fill factor drops to $1.39 \times 10^5 / cm^2$ and 6.96% respectively. The fill factors of 2D and 3D microfilters are much higher than track etched polycarbonate filters, which typically have reported fill factor of less than 2% to avoid significant pore overlapping during fabrication. Higher pore density facilitates filtration of higher volume without clogging and limits the area for the observer to scan for captured target cells, yielding a more efficient overall process.

Since CTCs are rare occurrences in blood, it is important to retain maximum number of target cells in a blood sample. The capture efficiency of filtration systems using an embodiment of the present invention has been characterized with a model system. The model system was constructed by spiking a known number of CFSE labeled MCF-7 cells into blood obtained from healthy donors. 342±58 MCF-7 cells were spiked in 1 mL of whole blood obtained from healthy donors and diluted with 9 ml of PBS before passing through a microfilter device according to an embodiment of the present invention. Numbers of captured cells were manually counted under fluorescence microscope right after filtration with the average of 296±16 (n=4) captured cells and capture efficiency of 86.5±16.5%. A single layer 2D microfilter device was shown to achieve similar results.

To confirm the capture of intact unfixed cells on embodiments according to the present invention, approximately 200 MCF-7 cells in 1 mL of PBS were filtered through a microfilter according to an embodiment of the present invention and observed with SEM. As shown in FIG. 10A, a cell with intact membrane was captured and sitting on a pore of the top filter layer with the cell size comparable to expected diameter of 13.6±1.3 μm. Furthermore, fluorescence confocal microscopy was used to examine how the cells were captured on the microfiltration device. The cytoplasm of MCF-7 cells was labeled with green fluorescent CFSE dye and the plasma membrane was labeled with red fluorescent labeled lipid analog, rhodamine DHPE. FIG. 10B is an image taken while keeping the focus at the top membrane surface. The 9 μm diameter ring corresponds to the top pore edge where the fluorescence from rhodamine DHPE intensifies at the pore edge within the depth of focus of the microscope. FIG. 10C is a reconstructed image based on an image stack of 0.5 μm vertical step size, showing the vertical cross section of the cell trapped in a pore. The cell part above the pore is more flat compared with SEM image. This may be due to the lipid analog labeling of cell membrane. Before filtration, the plasma membrane of the labeled cells seems to be more flexible and the cells changed their shape with pseudopodia under conventional fluorescent microscope.

Figure 11A:
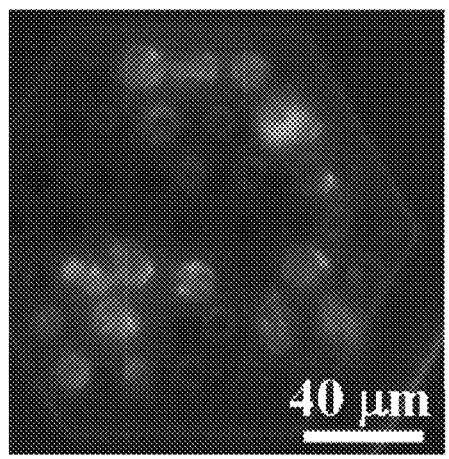
FIGS. 11A-11E show the results of IF staining when using a 3D microfiltration device.
Figure 11B:
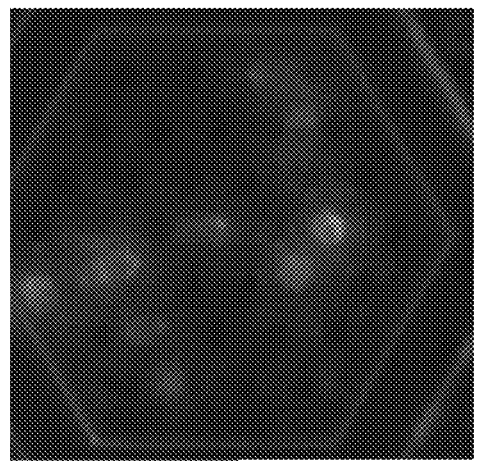
Figure 11C:
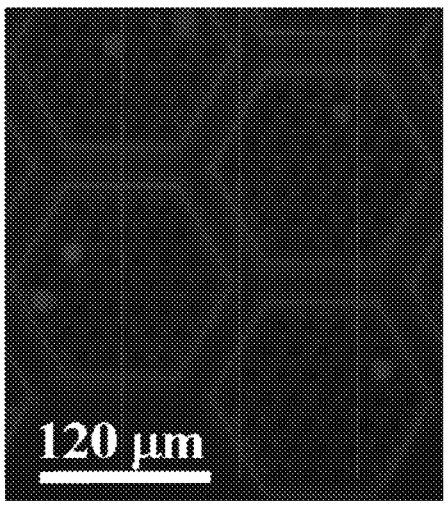
Figure 11D:
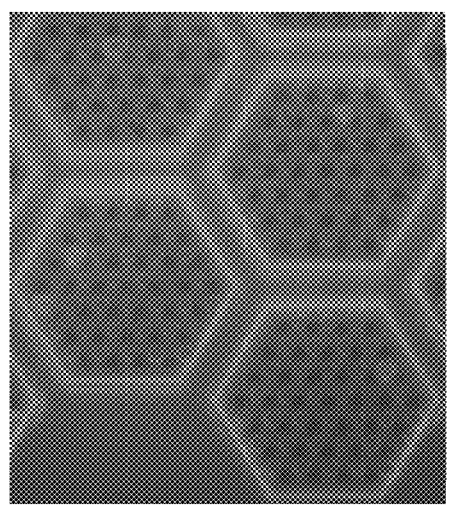
Figure 11E:
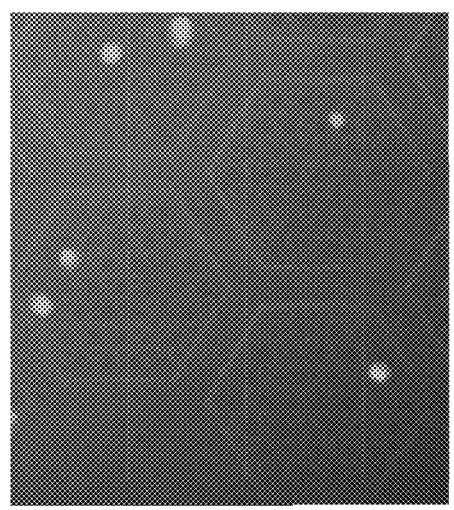

Interrogation of specific protein expression of captured cell using immunofluorescent (IF) staining is an integral part of the CTC detection process that allows an observer to distinguish between different cell types. The model system was used to demonstrate the ability to perform on-chip IF for the expression of CK. The results of IF staining are shown in FIGS. 11A-11E FIG. 11A shows a positive control with sample containing only tumor cells in PBS (i.e., an MCF7 and LNCaPP mix without blood stained with anti-CK). FIG. 1B is the result where culture cell lines were admixed in blood before filtration, i.e., an MCF7 and LNCaP mix with blood stained with anti-CK. In addition to single marker analysis of captured cells, the capability for multi-marker IF analysis using LNCaP cells, which express prostate specific antigen (PSA) in addition to CK, was demonstrated. Approximately 100 LNCaP cells were spiked in PBS, filtered through 3D microfilter devices, and fixed with formalin. FIG. 11C shows the red channel of double IF staining with anti-CK of LNCaP cells without blood. FIG. 11D shows the green channel of double IF staining with anti-PSA of LNCaP cells without blood. As shown in FIGS. 11C and 11D, the LNCaP cells were positive for both CK (FIG. 11C) and PSA (FIG. 11D). The cells were stained afterwards with nucleic acid selective fluorescent dye, acridine orange (AO) to confirm the presence of cell nucleus. This result is shown in FIG. 11E, which shows the green channel of double IF staining with AO.

Figure 12A:
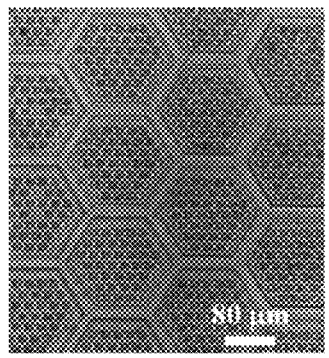
FIGS. 12A-12E show the results of cell viability tests using a 3D microfiltration device.
Figure 12B:
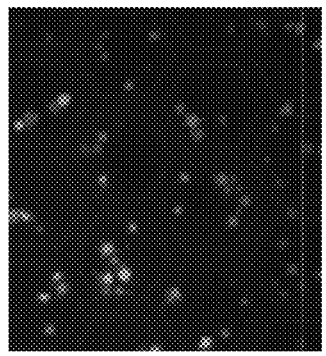

To further validate the viability of the captured tumor cells on exemplary embodiments according to the present invention; the cells were cultured on a device for two weeks and confirmed with a functional assay. CFSE labeled cells mixed with blood from healthy donors were filtered through a microfiltration device, washed with PBS, and cultured in a petri dish for two weeks. On the 14th day, the device was washed twice with PBS and $C_{12}$-resazurin was added to the petri dish containing the device at a final concentration of 5 μM. The reaction mixture was allowed to incubate for 15 minutes in a humidified incubator at 5% $CO_2$ and 37° C. Excess amount of PBS was added to the petri with gentle mixing and analyzed under epi fluorescent microscope with red emission filter block (Nikon G-2E/C) immediately. FIGS. 12A-12E depict the results obtained from these cell viability tests. Immediately after filtering a sample of CFSE labeled MCF-7 cells admixed in blood, the microfilter device was placed inside a petri dish containing complete culture media and checked under the bright field microscopy for device integrity and fluorescence for the presence of intact captured cells. FIG. 12A shows the device right after filtration under bright field illumination showing the geometry of the patches and the two layers of pores. FIG. 12B shows the device right after illumination from a green fluorescent emission channel.

Figure 12C:
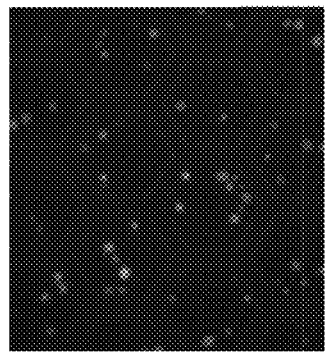

As noted, the captured cells were cultured for 2 weeks inside the petri dish. FIG. 12C shows the device 14 days later under a green fluorescent emission channel. As seen in FIG. 12C, most of the captured cells remained in the same positions. It is interesting to note the number of green fluorescent cells reduced from 71 to 61 in the same area during the two week period. It is possible these cells were damaged during the filtration process, passively moved by the flow of fluids when changing the media, or actively moved out of the pores and into the cell culture container. There is one interesting case, where a fluorescent cell appeared on a spot where it was not occupied by a cell originally. This may be an example of either passive or active mobility of the cell. Overall, after two weeks of cell culture, at least over 85% of the tumor cells had intact cell membrane. A separate negative control was performed (data not shown), in which CFSE labeled MCF-7 cells were filtered through 3D microfilter device, checked for bright green fluorescence. After treated with common fixative acetone, the original bright green fluorescent spots turned dark. It is well known that acetone makes cell surface permeable by removing lipids, precipitating proteins, and dehydrating the cells. Thus CFSE in cytoplasm leaks out of the cells rendering dark spots that was originally occupied by captured bright green fluorescent cells.

Figure 12D:
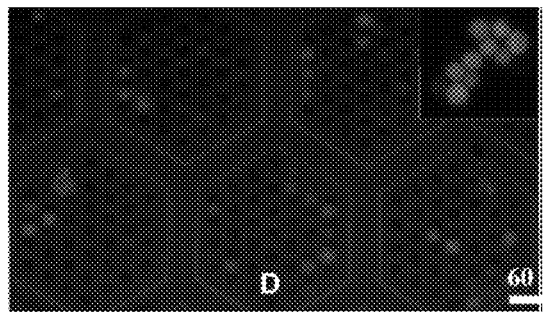
Figure 12E:
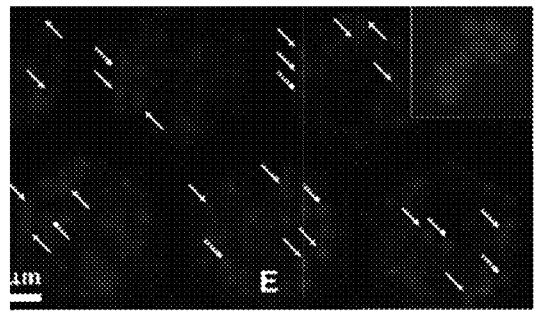

Captured tumor cells on the micro device were tested with $C_{12}$-resazurin functional assay to demonstrate active metabolic activity. $C_{12}$-resazurin (dodecyl-resazurin) readily diffuses across cellular membrane and is reduced to red-fluorescent $C_{12}$-resorufin in metabolically active cells; therefore, marking metabolic active cells red. FIG. 12D shows a close up of the device before the $C_{12}$-resazurin staining, while FIG. 12E shows the device after the $C_{12}$-resazurin staining under a red fluorescent emission cannel. As shown in FIG. 12E, metabolic active cells were labeled red along with a high background coming from blood cells. Most of the captured tumor cells in FIG. 12D correspond to red fluorescent areas (arrows in FIG. 12E) indicating tumor cells were metabolically active even after two weeks of culture. Insets of FIGS. 12D and 12E are positive controls with fresh MCF-7 cells loaded on a parylene surface and stained with $C_{12}$-resorufin.

As used herein, the term "parylene" refers to a polymer having formulae similar to formulas I, II and III or combinations thereof.

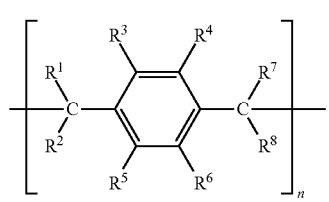

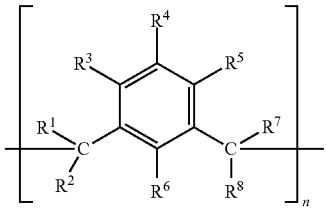

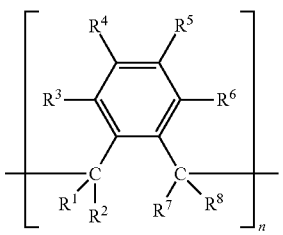

Formulas I, II and III show the chemical composition of common parylene variants. The polymer can be a homopolymer, a copolymer, a polymer blend or combinations thereof. In formulas I to III, $R^1$, $R^2$, $R^7$ and $R^8$ are each independently H, alkyl, heteroalkyl, aryl or halogen. The alkyl can be a $C_1$-$C_6$ hydrocarbon radical. The halogen is Cl, F, Br, or I. Heteroalkyl is an alkyl substituent containing at least one heteroatom, such as O, S, N, Si or P. $R^3$-$R^6$ are each independently H, alkyl, aryl, halogen, heteroalkyl, hydroxyl, amino, alkylamino, arylamino, aroylamino, carbamoylamino, aryloxy, acyl, thio, alkylthio, cyano, alkoxy. An alkyl group can be a substituted alkyl having up to 29 carbon atoms. A substituted alkyl can be mono- or polyunsaturated alkenyl or alkynyl radical having in each case up to 29 carbon atoms, i.e., a substituted $C_1$-$C_{29}$alkyl, $C_2$-$C_{29}$alkenyl or $C_2$-$C_{29}$alkynyl radical. Suitable substitutents are also cyclic radicals. The substituted alkyls can be methyl, ethyl, or propyl radical, carrying one or more identical or different radicals. Depending on the nature of the substitutents, these can be attached via a single or multiple bond or in a spiro form. Preferred substitutents are halogen, such as Cl, F, Br or I, amino, lower alkylamino, lower alkanoylamino, aroylamino, such as, in particular, benzoyl amino, hyroxyamino, hydroxyimino, lower alkoxyamino, aroxyamino, such as, in particular, phenoxyamino. Lower alkylthio includes $C_1$-$C_6$alkylthiols. Aryloxycarbonyl includes phenoxycarbonyl, benzyloxycarbonyl, hydroxyaminocarbonyl, aminoacylamino, carbamoyl, amidino. Aryoxy can be phenyloxy, aminocarbonyl-oxy, oxo, aminosulfonyl and lower alkylsulfonyl-amino. Heteroalkyl is an alkyl substitutent having one or more heteroatoms in the alkyl substitutents, in particular, mercaptoalkyl having up to 29 carbon atoms, aminoalkyl, phosphinoalkyl, haloalkyl, hydroxyalkyl or silylalkyl. Preferably, parylene used in exemplary embodiments of the present invention has a structure represented by formula I. In preferred embodiments of the above, $R^1$, $R^2$, $R^7$, and $R^8$ are independently hydrogen or $C_1$-$C_6$ alkyl. In other embodiments of the above, $R^3$ to $R^6$ are independently hydrogen or $C_1$-$C_6$ alkyl. In other embodiments of the above, $R^1$, $R^2$, $R^7$, and $R^8$ are independently hydrogen or $C_1$-$C_6$ alkyl and at least one or one of $R^3$ to $R^6$ comprises or is a functional group (e.g., amino, thio, hydroxy, halo). In some further embodiments, the halo group is chloro or fluoro. In some embodiments of any of the above, the $R^1$ to $R^8$ members are not themselves substituted.

Functionalized parylene polymers are also contemplated. Functionalized parylene includes a parylene having formula I, wherein at least one of the $R^3$ to $R^6$ members is a functional group. Suitable functional groups include, but are not limited to, optionally substituted amino, hydroxyl, hydroxyamino, heteroalkyl, heteroaryl, mercapto, formyl, alkanoyl, carboxylate, alkoxycarbonyl, alkoxycarbonyloxy, hydroxycarbonyl, halide, cyano, amide, carbamoyl, thiocarbamoyl, ureido and thioureido. Heteroalkyl refers to alkyl groups (or rings) that contain at least one heteroatom selected from N, O, and S, wherein the nitrogen and sulfur atoms are optionally oxidized, and the nitrogen atom(s) are optionally quaternized. A heteroatom can form a double bond with a carbon atom. A heteroalkyl group can be attached to the remainder of the molecule through a/the heteroatom. Heteroaryl refers to aryl groups that contain from one to five heteroatoms selected from N, O, and S, wherein the nitrogen and sulfur atoms are optionally oxidized, and the nitrogen atom(s) are optionally quaternized. In preferred embodiments of the above, $R^1$, $R^2$, $R^7$, and $R^8$ are each hydrogen or $C_1$-$C_3$ alkyl. In some embodiments, only one of the R.sup.3 to R.sup.6 members is a functional group.

Preferred types of parylene include commercially available parylene C, F, A, AM, N, and D. The three most common types of parylene are parylene N, parylene C, and parylene D, all identifiable by a skilled person. In particular parylene C indicates polymer of formula IV.

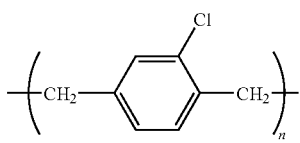

IV

Embodiments of the present invention preferably use parylene-C for the filtration membranes. Parylene-C (poly-para-xylylene) is preferred for embodiments of the present invention due to some of its unique properties. It is a mechanically strong (Young's modulus 4 GPa and tensile strength: 70 MPa) while malleable (elongation to break 200%) polymer. Since parylene is optically transparent in visible range, this embodiments using parylene enable direct on-chip pathological observation as discussed above. Chemically, parylene is inert to most of the chemicals and solvents used in standard chemical and biological laboratories yielding compatibility with most post-processing (e.g., cell fixation, lysing, staining) steps to be performed on devices without complexities and cell loss associated with added transfer step. Moreover, parylene is a highly biocompatible polymer that can meet the highest standard for long-term implantation or cell culture as shown. Lastly, parylene membrane filtration devices should experience less clogging and membrane fouling due to reduced protein absorption and cell adhesion. Various parylene and parylene-like materials can be used for the filtering membranes in embodiments of the present invention when circulating tumor cells are to be detected. As such, other materials, such as polyimide, polysiloxane, polyester, polyacrylate, cellulose, Teflon™ and polycarbonate may also be suitable membrane materials. The substrates used in embodiments of the present invention are not limited to materials discussed above, but also include other materials, which perform substantially the same function as parylene, in substantially the same way as parylene and achieve substantially the same result as parylene. These other materials may be used to fabricate embodiments according to the present invention, but, as described above, parylene is preferred.

Embodiments of the present invention support and provide a method for viable capture of rare occurring CTCs in the complex fluid of blood. These embodiments comprise a microfiltration device that can enrich viable CTCs with up to 86% capture efficiency in a few minutes. These embodiments may effectively reduce the cell membrane tension during the filtration process for viable capture. These embodiments may also support the ability to perform on-chip multimarker immunofluorescence analysis. Captured cells were shown to be viable and metabolically active even after two weeks of cell culture on the device. Embodiments of the present invention may provide a valuable tool for metastatic cancer diagnosis, treatment monitoring, personalized drug screening, and research of CTCs.

Embodiments of the present invention may also provide systems for detection of a target together with other components such as labeling molecules and other appropriate reagents.

In some embodiments, the labeling molecule can be included in the detection system, including but not limited to, labeled polynucleotides, labeled antibodies, other labels identifiable by the skilled person upon reading of the present disclosure. Additional components can also be included and comprise microfluidic chips, reference standards, and additional components identifiable by a skilled person upon reading of the present disclosure.

Detection systems according to embodiments of the present invention can be, in particular, provided in the form of kits of parts. In the kit of parts, the components of the kit can be provided, with suitable instructions and other necessary reagents, in order to perform the methods here disclosed. In some embodiments, the kit can contain the compositions in separate containers. Instructions, for example written or audio instructions, on paper or electronic support such as tapes or CD-ROMs, for carrying out the assay, can also be included in the kit. The kit can also contain, depending on the particular method used, other packaged reagents and materials (i.e. wash buffers and the like).

Detection systems according to embodiments of the present invention may include devices arrays, and/or microfiltration systems according to any embodiments here disclosed, which include embodiments described in the foregoing and additional and/or alternative embodiments.

Figure 13:
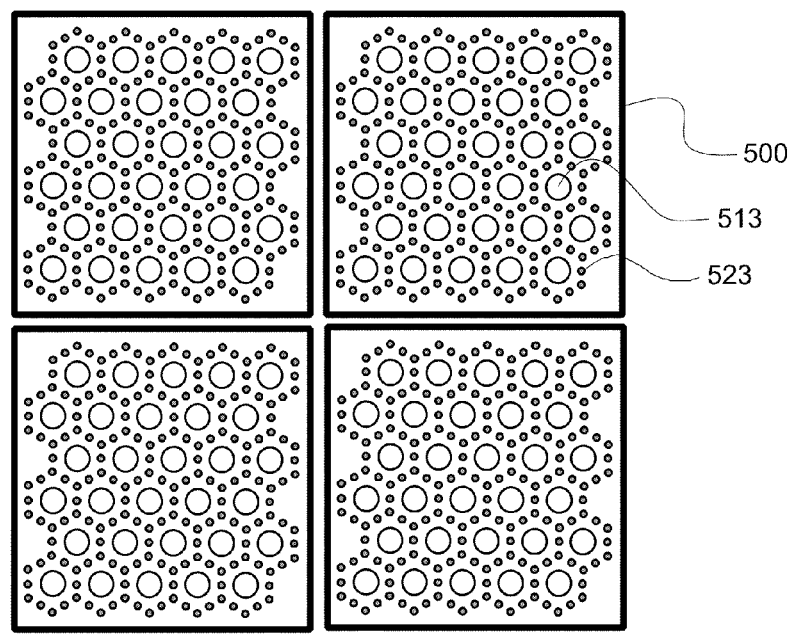
FIG. 13 depicts a 3D filter unit with filter patches with larger diameter top pores.
Figure 14:
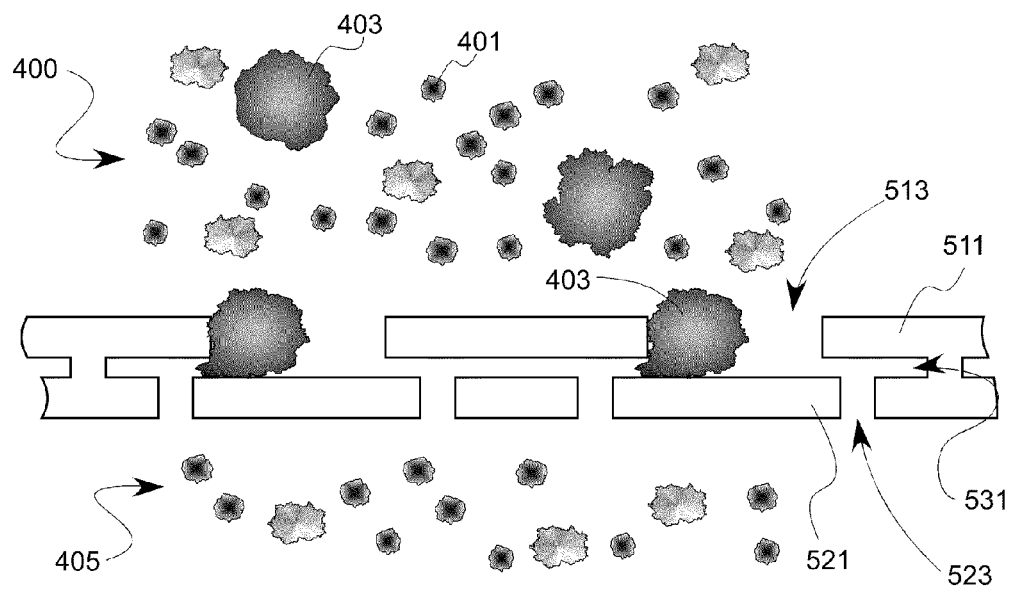
FIG. 14 depicts a cut-away side view of a portion of a 3D filter unit with filter patches having larger diameter top pores.

An alternative embodiment according to the present invention is depicted in FIG. 13 and FIG. 14. FIG. 13 shows a top down view of four filter patches 500 in a filter array of a 3D filter unit. Each filter patch 500 has several top membrane pores 513 and several bottom membrane pores 523. FIG. 14 shows a cut-away side view of a portion of one of the filter patches. As shown in FIG. 14, the top membrane pores 513 are located within a top membrane 511 and the bottom membrane pores are located in a bottom membrane 521. A gap 531 separates the top membrane 511 from the bottom membrane 521.

The diameters of the top membrane pores 513 and bottom membrane pores 523, the density and distribution of the pores, and the gap 531 can all be varied. Specific values may be chosen for different applications. For CTC enrichment from blood, any pore to directly capture a CTC will generally need to between roughly 3 μm to 15 μm. Towards the smaller size (3 μm), more and more blood cells will be captured so enrichment becomes worse. Towards the larger size (15 μm), more and more CTCs can escape from the filter, so the capture efficiency becomes worse.

The filter patch depicted in FIG. 13 has top membrane pore diameters of 40 μm and bottom membrane pore diameters of 8 μm. The bottom membrane pores 523 are arranged in hexagon shape around each top membrane pore 513 with 50 μm on each side, so the bottom membrane pores 523 are offset from the top membrane pores 513. The gap distance between top membrane 511 and bottom membrane 521 is 5.5 μm. In the filter patch 500 depicted in FIG. 13 and FIG. 14, the gap 531 is used as an active filtration mechanism. The filter patch 500 has a large top pore size (40 μm in diameter) to avoid the pore capture mechanism. Instead, the filter patch 500 uses the gap 531 for capture. Note, however, that the filter patch 500 can be used upside down, where the bottom membrane pores 523 will be used to capture the cells with pore capture mechanism.

FIG. 14 illustrates the capture mechanism of the filter patch 500 having larger sized top membrane pores 513. As indicated above and shown in FIG. 14, the top membrane pores 513 will have diameters larger than CTCs 403 and much larger than smaller sized cells (such as blood cells) 401 in a sample 400. Hence, the CTCs 403 will easily flow through the top membrane pores 513, but will become wedged between the top membrane 511 and the bottom membrane 521 at the gap 531. The smaller sized cells 403 should easily flow through the gap 531 and the bottom membrane 521 to become part of the filtrate 405. The trapped CTCs 403 will still be mostly supported by the bottom membrane 521 (due to the offset between the top membrane pores 513 and bottom membrane pores 523), which will counteract the fluidic force from above the CTCs 403. Hence, this cell capture by this alternative embodiment should still result in a high percentage of viable captured cells. Note that an array of filter patches 500 may be used in a manner and apparatus similar to that described above in relation to FIG. 6A to provide for filtering of a sample or other apparatus or methods may be used to use the array of filter patches 500 for sample filtering. Techniques similar to those described above or others known in the art may also be used to detect and identify captured cells.

Figure 15A:
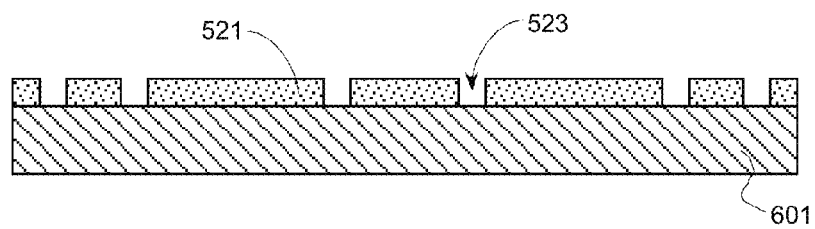
FIGS. 15A-15E depicts a process for fabricating the filter unit depicted in FIGS. 13 and 14.
Figure 15B:
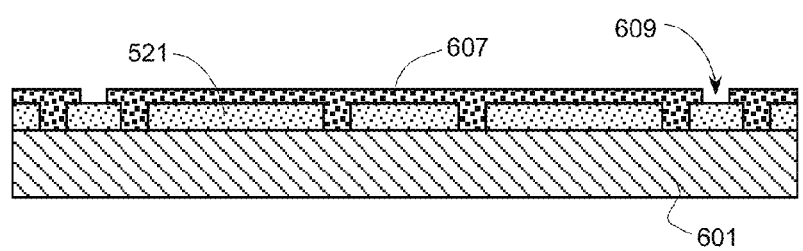
Figure 15C:
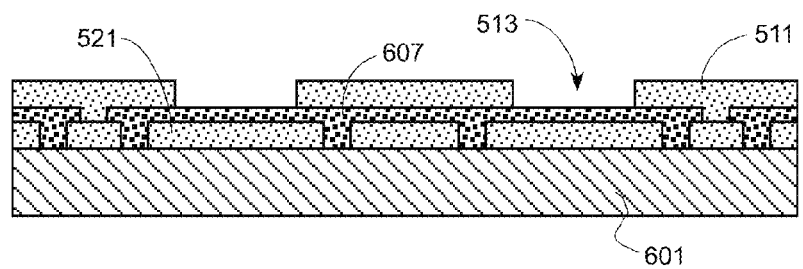
Figure 15D:
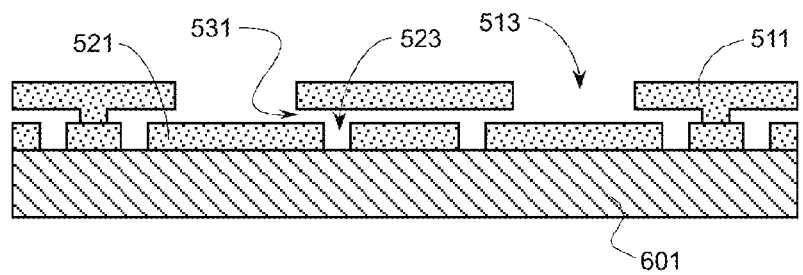
Figure 15E:
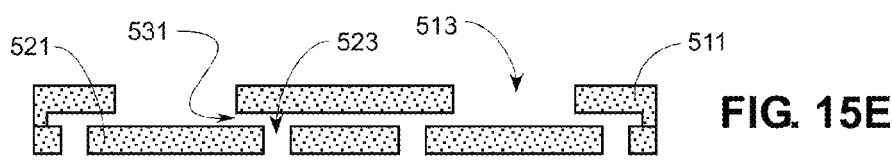

FIGS. 15A-15E illustrate a process by which the embodiment depicted in FIGS. 13 and 14 may be made. In FIG. 15A, the bottom membrane 521 is disposed on a silicon substrate 601 and patterned with oxygen plasma to form the bottom membrane pores 523. Preferably, the bottom membrane 521 is a layer of parylene that is 10 μm thick, but other materials and/or other thicknesses may be used. FIG. 15B depicts the deposition and patterning of a photoresist layer 607. The photoresist layer 607 is patterned by photolithography to form areas 609 where the top membrane 511 will contact the bottom membrane 521. The thickness of the photoresist layer 607 will determine the size of the gap 531. FIG. 15C shows the deposition of the top membrane 511 and patterning with oxygen plasma of the top membrane 511 to form the top membrane pores 513. Again, the top membrane 511 is preferably a layer of parylene that is 10 μm thick, but other materials and/or other thicknesses may be used. FIG. 15D shows the removal of the sacrificial photoresist layer 607 to provide the gap 531 between the bottom membrane 521 and the top membrane 511. FIG. 15E depicts the release of the assembly from the silicon substrate 601 and cutting of the assembly to provide filter arrays with desired sizes.

Figure 16:
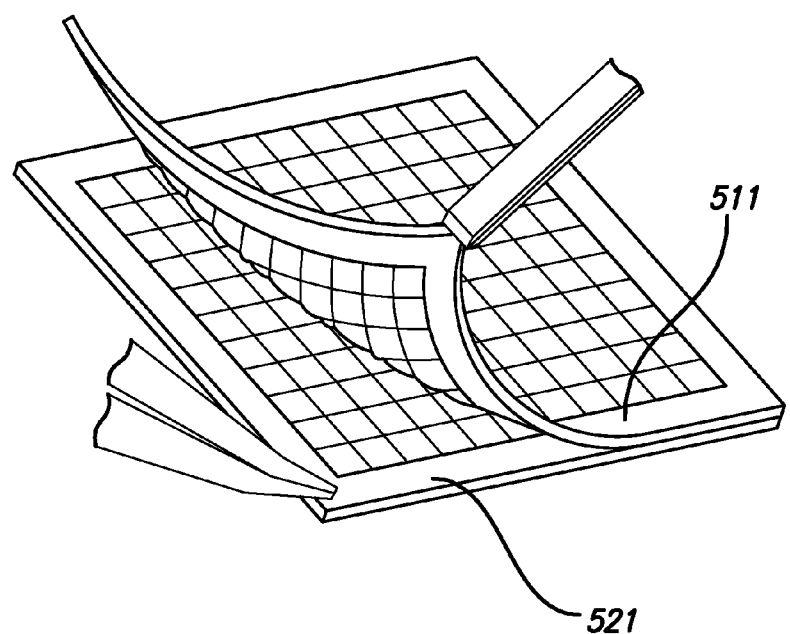
FIG. 16 shows a figure of where the top porous membrane is split from the bottom porous membrane.

Fabricating the alternative embodiment in the manner described immediately above provides that there is no silicon substrate left on the final assembly. Removal of the silicon substrate may simplify the fabrication process and also make the overall assembly optically transparent, thus easier for observation in some cases. However, in the fabrication processes where the silicon substrate remains, the final assemblies may be easier to handle directly by hand.

Where the final assembly simply consists of a top porous membrane and a bottom porous membrane, the top and bottom membranes of the assembly may be split apart after filtration to expose captured cells. Splitting the membranes apart may provide more efficient access to the captured cells by surrounding chemicals. For example, lysing the cells chemically for analysis can be faster and more complete. The diffusion time for introducing a chemical reagent to interact with captured cells can be shorter. FIG. 16 shows a figure of where the top membrane 511 is split from the bottom membrane 521 by tweezers.

Embodiments of the present invention as depicted in FIGS. 13 and 14 have demonstrated a capture efficiency of around 87% when tested with viable fluorescent dye labeled cultured tumor cells in phosphate buffered saline (PBS). Judging by the membrane integrity (no fluorescent dye leak), the cells are viable after filtration and before splitting the top and bottom membrane. After splitting, at least some cells still maintain bright fluorescent color. Cases of cells detached from the devices were observed. They are either floating or later attached to a Petri dish if the device placed in Petri dish with appropriate cell culture media.

Embodiments of the present invention may have the surface properties of the filter patches modified by physically treating the surface in ozone environment and chemically by dynamic coating with different chemicals. For the later, Matrigel™ from Becton Dickinson and polyethyleneimine (PEI) have been used to enhance the adhesion between cells to the surface, while Pluronic F-68, Pluronic F-127, and hyaluronic acid (HA) may be used to decrease the adhesion between cells to the surface.

Embodiments of the present invention may also be associated with a microfluidic component so to allow performance of microfluidic based assays. Microfluidic-based assays offer advantages such as reduced sample and reagent volumes, and shortened assay times.

The term "microfluidic" as used herein refers to a component or system that has microfluidic features, e.g., channels and/or chambers that are generally fabricated in the micron or sub-micron scale. For example, the typical channels or chambers have at least one cross-sectional dimension in the range of about 0.1 microns to about 1500 microns, more typically in the range of about 0.2 microns to about 1000 microns, still more typically in the range of about 0.4 microns to about 500 microns. Individual microfluidic features typically hold very small quantities of fluid, e.g from about 10 nanoliters to about 5 milliliters, more typically from about 100 nanoliters to about 2 milliliters, still more typically from about 200 nanoliters to about 500 microliters, or yet more typically from about 500 nanoliters to about 200 microliters.

The microfluidic components can be included in an integrated device. As used herein, "integrated device" refers to a device having two (or more) components physically and operably joined together. The components may be (fully or partially) fabricated separate from each other and joined after their (full or partial) fabrication, or the integrated device may be fabricated including the distinct components in the integrated device. An integrated microfluidic device includes a microfiltration component joined to a microfluidic component, wherein the microfiltration component and the microfluidic component are in operable association with each other such that the microfiltration component is in fluid communication with a microfluidic feature of the microfluidic component. A microfluidic component is a component that includes a microfluidic feature and is adapted to being in operable association with an microfiltration component. A microfiltration component is a component that includes a microfiltration device, array or system and is adapted to being in operable association with a microfluidic component.

The microfluidic systems can also be provided in a modular form. The term "modular" describes a system or device having multiple standardized components for use together, wherein one of multiple different examples of a type of component may be substituted for another of the same type of component to alter the function or capabilities of the system or device; in such a system or device, each of the standardized components being a "module".

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. In particular it is to be understood that the disclosures are not limited to particular compositions or biological systems, which can, of course, vary. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only, and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A microfiltration patch comprising:
a top porous membrane having top membrane pores extending vertically through the top porous membrane from an upper surface of the top porous membrane to a lower surface of the top porous membrane;
a bottom porous membrane having bottom membrane pores extending vertically through the bottom porous membrane from an upper surface of the bottom porous membrane to a lower surface of the bottom porous membrane, wherein several of the bottom membrane pores are distributed in the bottom porous membrane to be horizontally offset from several of the top membrane pores distributed in the top porous membrane;
a single gap defined by a planer space between the lower surface of the top porous membrane and the upper surface of the bottom porous membrane, wherein the gap comprises the planar space between a plurality of top membrane pores and a plurality of bottom membrane pores, wherein a gap distance between the lower surface of the top porous membrane and the upper surface of the bottom porous membrane is substantially equal over an area defined by the gap and wherein the gap distance is larger than particles not to be captured by the microfiltration patch and wherein no structures are present in the gap that obstruct a flow of particles from the top membrane pores to the bottom membrane pores; and
a perimeter structure surrounding the gap, wherein the perimeter structure couples the top porous membrane to the bottom porous membrane.

2. The microfiltration patch according to claim 1, wherein diameters of several top membrane pores are sized to capture particles having selected particle diameters and the gap distance is selected to position the bottom porous membrane to support particles captured within at least one of the top membrane pores and minimize damage to one or more captured particles.

3. The microfiltration patch according to claim 2, wherein the top membrane pores and bottom membrane pores have diameters greater than diameters of blood cells and smaller than diameters of circulating tumor cells and wherein the gap distance is smaller than the diameters of the circulating tumor cells.

4. The microfiltration patch according to claim 1, wherein diameters of several top membrane pores are sized larger than particle diameters of particles to be captured and diameters of the bottom membrane pores are sized smaller than particle diameters of particles to be captured and the gap distance is smaller than particle diameters of particles to be captured.

5. The microfiltration patch according to claim 4, wherein the bottom membrane pores have diameters greater than diameters of blood cells and smaller than diameters of circulating tumor cells and wherein the gap distance is smaller than the diameters of the circulating tumor cells.

6. The microfiltration patch according to claim 1, wherein the top porous membrane and/or bottom porous membrane comprises parylene.

7. The microfiltration patch according to claim 3, wherein the top membrane pores have diameters of approximately 9 micrometers, the bottom membrane pores have diameters of approximately 8 micrometers and the gap distance is approximately 6.5 micrometers.

8. The microfiltration patch according to claim 5, wherein the top membrane pores have diameters of approximately 40 micrometers, the bottom membrane pores have diameters of approximately 8 micrometers and the gap distance is approximately 5.5 micrometers.

9. The microfiltration patch according to claim 4, wherein the top membrane pores have diameters of approximately 40 micrometers, the bottom membrane pores have diameters of approximately 8 micrometers and the gap size is approximately 5.5 micrometers.

10. A microfiltration array comprising several microfiltration patches according to claim 1, wherein each microfiltration patch comprises top membrane pores arranged in a first hexagonal array and bottom membrane pores arranged in a second hexagonal array, and wherein the several microfiltration patches are arranged in an array of microfiltration patches, wherein the several microfiltration patches are separated from one another by areas in which the top membrane contacts the bottom membrane.

11. A microfiltration array comprising several microfiltration patches according to claim 1, wherein the bottom membrane pores are distributed in hexagonal arrays around a center area defined by the locations of the top membrane pores, and wherein the several microfiltration patches are arranged in an array of microfiltration patches, wherein the several microfiltration patches are separated from one another by areas in which the top porous membrane contacts the bottom porous membrane.

12. A microfiltration system comprising one or more microfiltration arrays according to claim 10, wherein the one or more microfiltration patches are formed within at least a portion of a silicon wafer and wherein the microfiltration system further comprises:
an upper area located above the top porous membranes of the microfiltration patches, wherein the upper area is pressurizable, and
a lower area located beneath the bottom porous membranes of the microfiltration patches, wherein the lower area is configured to allow reception of fluids.

13. A microfiltration system comprising one or more microfiltration arrays according to claim 11, wherein the one or more microfiltration patches comprise two parylene layers and wherein the microfiltration system further comprises:
an upper area located above the top porous membranes of the microfiltration patches, wherein the upper area is pressurizable, and
a lower area located beneath the bottom porous membranes of the microfiltration patches, wherein the lower area is configured to allow reception of fluids.

14. The microfiltration patch according to claim 1, wherein the top porous membrane, bottom porous membrane or both the top and bottom porous membrane comprise a material selected from one of the following materials: polyimide; polysiloxane; polyester; polyacrylate; cellulose; Teflon™; and polycarbonate.

15. The microfiltration patch according to claim 1, wherein the top porous membrane is joined to the bottom porous membrane in a manner to allow separation of the top porous membrane from the bottom porous membrane.

16. A cell separation structure comprising:
a top porous membrane comprising a plurality of top membrane pores;
a bottom porous membrane comprising a plurality of bottom membrane pores, wherein each top membrane pore has several bottom membranes pores distributed beneath and around each top membrane pore and the several bottom membrane pores are horizontally offset from each top membrane pore and wherein each bottom membrane pore has a diameter smaller than at least one top membrane pore;
a single gap separating the top porous membrane and the bottom porous membrane, wherein a gap distance between the top porous membrane and the bottom porous membrane is smaller than a diameter of at least one bottom membrane pore and wherein no structures are present in the gap that obstruct a flow of particles from the top membrane pores to the bottom membrane pores; and
a perimeter wall surrounding a plurality of top membrane pores and bottom membrane pores and surrounding the single gap, wherein the perimeter wall couples the top porous membrane to the bottom porous membrane.

17. The cell separation structure according to claim 16, wherein the top porous membrane, bottom porous membrane or both the top and bottom porous membrane comprise a material selected from one of the following materials: parylene; polyimide; polysiloxane; polyester; polyacrylate; cellulose; Teflon™; and polycarbonate.

18. The cell separation structure according to claim 16, wherein the top membrane pores have diameters larger than diameters of circulating tumor cells and the gap distance is smaller than diameters of circulating tumor cells.

19. The cell separation structure according to claim 16, wherein the bottom membrane pores are arranged in hexagon shape around each top membrane pore.

20. The cell separation structure according to claim 16, wherein the perimeter wall is fabricated to allow separation of the top porous membrane from the bottom porous membrane after cells are captured by the cell separation structure.

* * * * *